(12) United States Patent
Yonezawa et al.

(10) Patent No.: US 9,981,701 B2
(45) Date of Patent: May 29, 2018

(54) VEHICLE UNDERSTRUCTURE

(71) Applicant: Honda Motor Co., Ltd., Tokyo (JP)

(72) Inventors: Masahito Yonezawa, Wako (JP);
Shinsuke Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/447,470

(22) Filed: Mar. 2, 2017

(65) Prior Publication Data
US 2017/0174272 A1 Jun. 22, 2017

Related U.S. Application Data

(63) Continuation of application No. PCT/JP2015/068241, filed on Jun. 24, 2015.

(30) Foreign Application Priority Data

Sep. 4, 2014 (JP) .................................. 2014-180615

(51) Int. Cl.
| | | |
|---|---|---|
| *B62D 35/02* | (2006.01) | |
| *B62D 37/02* | (2006.01) | |
| *B62D 25/20* | (2006.01) | |
| *B62D 27/06* | (2006.01) | |
| *B62D 29/04* | (2006.01) | |

(52) U.S. Cl.
CPC ............ *B62D 37/02* (2013.01); *B62D 25/20* (2013.01); *B62D 27/065* (2013.01); *B62D 35/02* (2013.01); *B62D 29/043* (2013.01)

(58) Field of Classification Search
CPC ....... B62D 35/02; B62D 37/02; B62D 29/043

USPC ........................................... 296/180.1, 180.5
See application file for complete search history.

(56) References Cited

U.S. PATENT DOCUMENTS 8,668,245 B2 * 3/2014 Kakiuchi ............... B62D 35/02
180/69.1

FOREIGN PATENT DOCUMENTS

| DE | 10209591 | * | 9/2003 | |
|---|---|---|---|---|
| DE | 102008037084 | * | 2/2011 | |
| DE | 102011085933 | * | 5/2013 | |
| DE | 102012018487 | * | 3/2014 | ............ B62D 35/02 |
| JP | 1-249582 A | | 10/1989 | |

(Continued)

OTHER PUBLICATIONS

International Search Report dated Sep. 29, 2015, issued in counterpart application No. PCT/JP2015/068241. (1 page).

(Continued)

*Primary Examiner* — Dennis H Pedder
(74) *Attorney, Agent, or Firm* — Westerman, Hattori, Daniels & Adrian, LLP

(57) ABSTRACT

A vehicle understructure includes a left undercover and a right undercover provided in an underpanel. The left undercover is provided from below inside in a vehicle width direction with respect to a left side sill between a left front wheel and a left rear wheel. The right undercover is provided from below inside in the vehicle width direction with respect to a right side sill between a right front wheel and a right rear wheel. Each of the left undercover and the right undercover includes a lowering portion. The lowering portion can lower from the underpanel during driving and extends in a vehicle longitudinal direction such that the vehicle longitudinal direction becomes a longitudinal direction.

5 Claims, 20 Drawing Sheets

(56) References Cited

FOREIGN PATENT DOCUMENTS

| | | |
|---|---|---|
| JP | 2006-69396 A | 3/2006 |
| JP | 2009-220689 A | 10/2009 |

OTHER PUBLICATIONS

Office Action dated Feb. 9, 2018, issued in counterpart Japanese Application No. 2016-546363, with partial English translation. (10 pages).

* cited by examiner

VEHICLE UNDERSTRUCTURE

This application is a continuation of International Patent Application No. PCT/JP2015/068241 filed on Jun. 24, 2015, and claims priority to Japanese Patent Application No. 2014-180615 filed on Sep. 4, 2014, the entire content of both of which is incorporated herein by reference.

BACKGROUND OF THE INVENTION

Field of the Invention

The present invention relates to a vehicle understructure in which an underpanel is provided in the lower portion of a vehicle, and the lower surface of the vehicle is formed by the underpanel.

Description of the Related Art

As a vehicle understructure, a structure is known in which an underpanel is provided in the lower portion of a vehicle, and an undercover is supported on the lower side of the underpanel to be movable in the vertical direction. The undercover is supported on the lower side of the underpanel. The whole area of the underpanel is covered from below by the undercover. That is, the undercover is formed flat all over the lower portion of the vehicle.

According to this vehicle understructure, a negative pressure is generated under the undercover (that is, in the space between the undercover and the road surface) during driving of the vehicle (more specifically, during driving at a medium or high speed). The generated negative pressure can lower the undercover. By lowering the undercover to make the ground clearance of the vehicle low, the negative pressure is satisfactorily generated between the undercover and the road surface. The stability of the vehicle is thus ensured (for example, see Japanese Patent Laid-Open No. 2009-220689).

In the vehicle understructure disclosed in Japanese Patent Laid-Open No. 2009-220689, however, the undercover is formed flat all over the lower portion of the vehicle, and the flat undercover can wholly be lowered. It is therefore difficult to suitably reduce an air resistance generated by an airflow that occurs during driving of the vehicle. From this viewpoint, there is still room for improvement.

It is an object of the present invention to provide a vehicle understructure capable of suitably reducing an air resistance.

SUMMARY OF THE INVENTION

According to the first aspect of the present invention, there is provided a vehicle understructure in which an underpanel is provided between left and right side sills provided in a vehicle, and a lower surface of the vehicle is formed by the underpanel, characterized by comprising an undercover located only on a rear side of the vehicle with respect to a front wheel and only on a front side of the vehicle with respect to a rear wheel in the underpanel and provided from below inside in a vehicle width direction with respect to the side sills, wherein the undercover comprises a lowering portion configured to lower from the underpanel during driving and extending in a vehicle longitudinal direction such that the vehicle longitudinal direction becomes a longitudinal direction.

Further features of the present invention will become apparent from the following description of exemplary embodiments with reference to the attached drawings.

DESCRIPTION OF THE EMBODIMENTS

The best mode for carrying out the present invention will now be described with reference to the accompanying drawings. Note that "front (Fr)", "rear (Rr)", "left (L)", and "right (R)" comply with directions viewed from a driver.

First Embodiment

A vehicle understructure 10 according to the first embodiment will be described.

Figure 1:
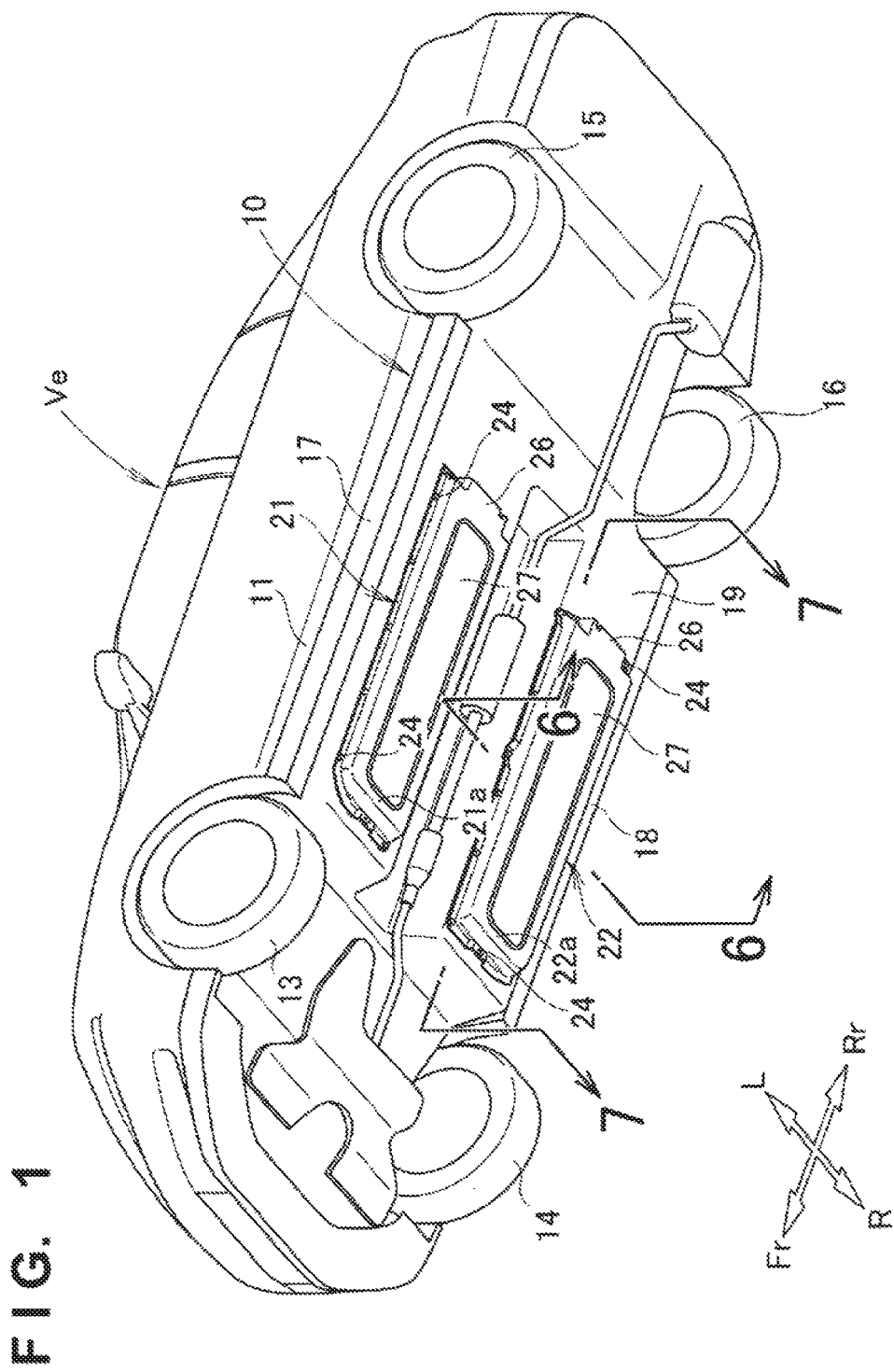
FIG. 1 is a perspective view showing a vehicle understructure according to the first embodiment of the present invention.
Figure 2:
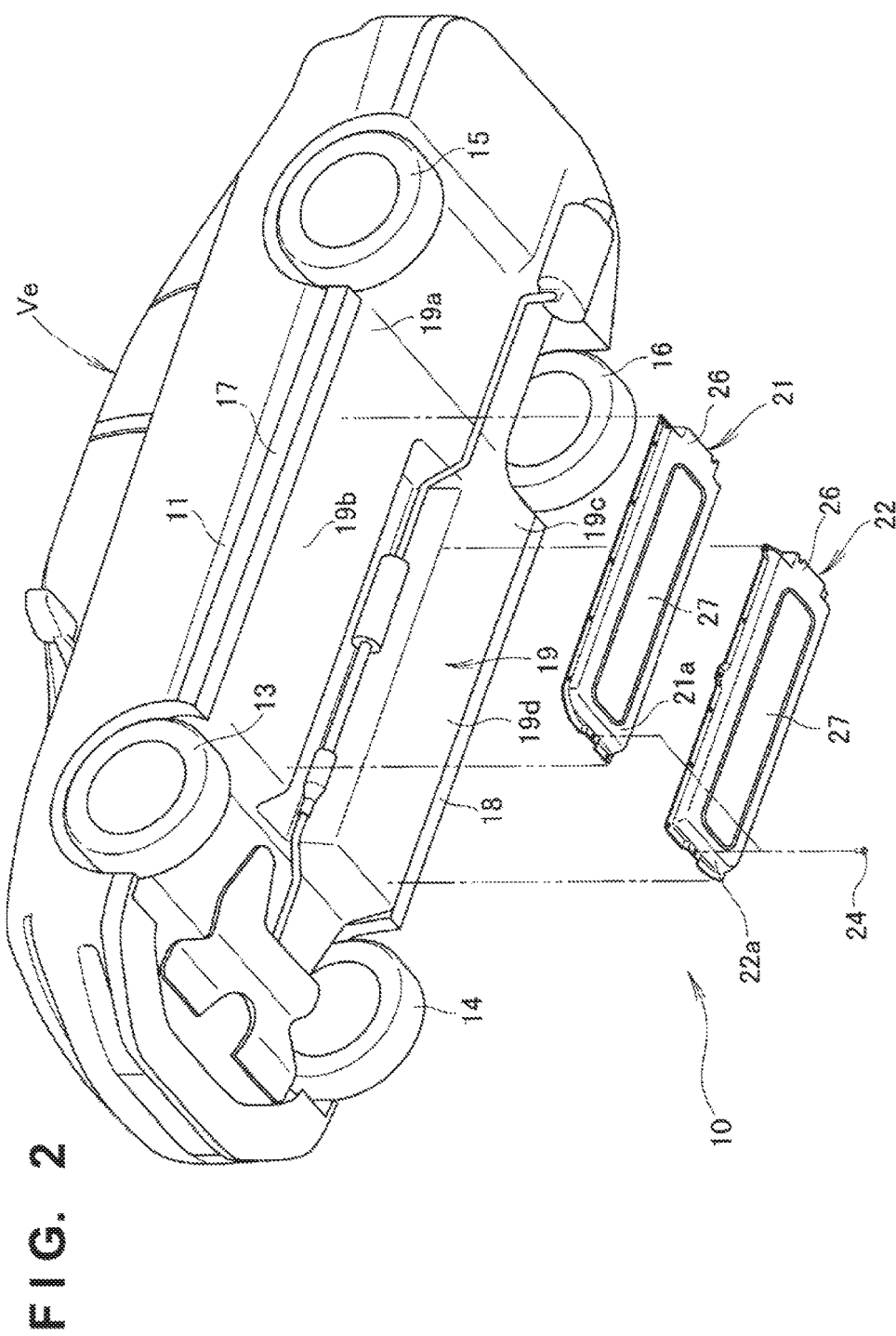
FIG. 2 is an exploded perspective view showing the vehicle understructure in FIG. 1.

As shown in FIGS. 1 and 2, a vehicle Ve has the vehicle understructure 10 in a vehicle lower portion 11. The vehicle understructure 10 includes a left front wheel 13 and a right front wheel 14 provided on the left and right sides in the front portion of the vehicle lower portion 11, a left rear wheel 15 and a right rear wheel 16 provided on the left and right sides in the rear portion of the vehicle lower portion 11, and a left side sill 17 and a right side sill 18 provided on the left and right sides of the vehicle lower portion 11.

The vehicle understructure 10 also includes an underpanel 19 arranged between the left side sill 17 and the right side sill 18, and a left undercover 21 and a right undercover 22 provided in the underpanel 19.

The left side sill 17 and the right side sill 18 are provided on the left and right sides of the vehicle lower portion 11, respectively, and the left and right lower frames of the vehicle lower portion 11 are thus formed by the left side sill 17 and the right side sill 18.

The underpanel 19 is provided between the left side sill 17 and the right side sill 18, and the lower surface (that is, the floor portion) of the vehicle is thus formed by the underpanel 19. The underpanel 19 is arranged above the road surface at an interval and extends in the vehicle longitudinal direction along the road surface.

The underpanel 19 includes a left mounting portion 19b provided on a left side portion 19a, and a right mounting portion 19d provided on a right side portion 19c. On the left side portion 19a of the underpanel 19, the left mounting portion 19b is provided between the left front wheel 13 and the left rear wheel 15 inside the left side sill 17 in the vehicle width direction. On the right side portion 19c of the underpanel 19, the right mounting portion 19d is provided between the right front wheel 14 and the right rear wheel 16 inside the right side sill 18 in the vehicle width direction.

The left undercover 21 is provided on the left mounting portion 19b of the underpanel 19. The right undercover 22 is provided on the right mounting portion 19d of the underpanel 19.

The left undercover 21 is mounted from below onto the left mounting portion 19b of the underpanel 19 by a plurality of bolts 24 and provided near the left side sill 17. The left undercover 21 is provided in the vehicle longitudinal direction along the left side sill 17. A front end 21a is arranged near the left front wheel 13 on the rear side of the vehicle.

The right undercover 22 is mounted from below onto the right mounting portion 19d of the underpanel 19 by a plurality of bolts 24 and provided near the right side sill 18. The right undercover 22 is provided in the vehicle longitudinal direction along the right side sill 18. A front end 22a is arranged near the right front wheel 14 on the rear side of the vehicle.

That is, the left undercover 21 and the right undercover 22 are respectively provided on the left and right sides of the underpanel 19 in the vehicle width direction at an interval in the vehicle width direction.

The left undercover 21 and the right undercover 22 are bilaterally symmetrical members. The right undercover 22 will be described below in detail. A detailed description of the left undercover 21 will be omitted. The constituent elements of the left undercover 21 are denoted by the same reference numerals as those for the right undercover 22.

Figure 3:
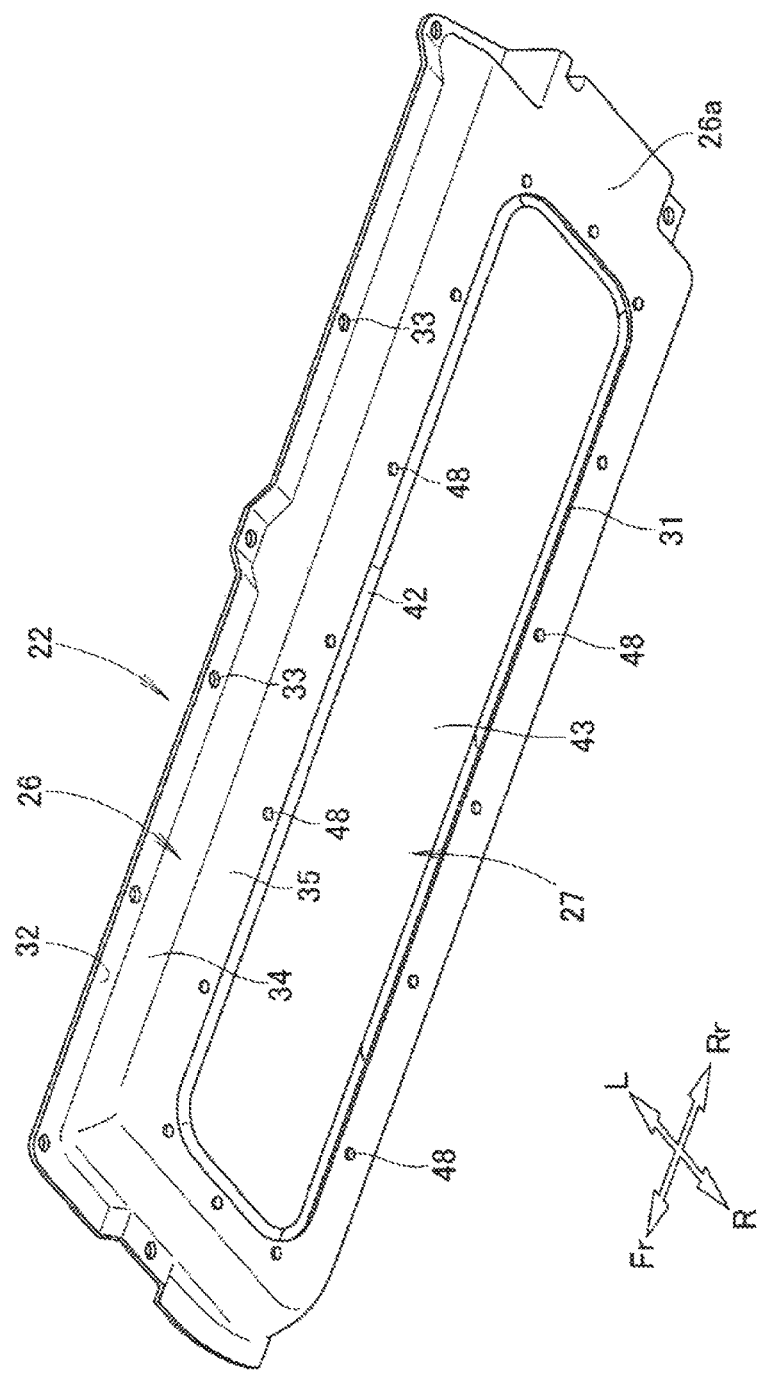
FIG. 3 is a perspective view showing a right undercover in FIG. 2.
Figure 4:
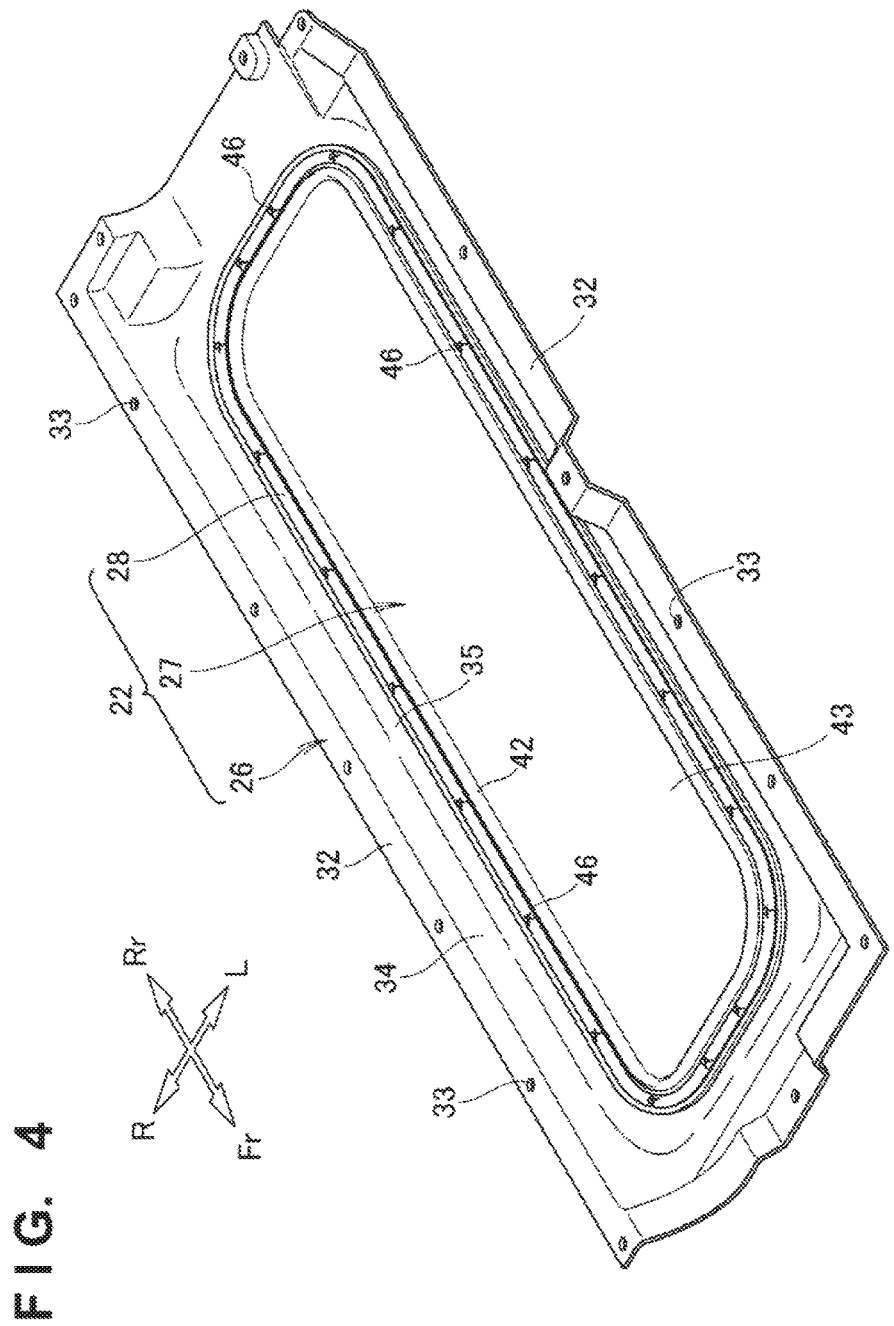
FIG. 4 is a perspective view showing a state in which the right undercover in FIG. 3 is viewed from the upper side.

As shown in FIGS. 3 and 4, the right undercover 22 includes a cover portion 26 mounted on the right mounting portion 19d of the underpanel 19 by the plurality of bolts 24 (see FIG. 2), a lowering portion 27 arranged in an opening portion 31 of the cover portion 26, and a mount frame portion 28 that holds the lowering portion 27 in the cover portion 26.

A plurality of mounting holes 33 arranged along a cover frame portion 32 of the cover portion 26 extend through the cover frame portion 32 in the vertical direction. The bolts 24 inserted into the plurality of mounting holes 33 are threadably connected to the right mounting portion 19d (see FIG. 2) of the underpanel 19. The cover portion 26 is thus mounted on the right mounting portion 19d.

Figure 5:
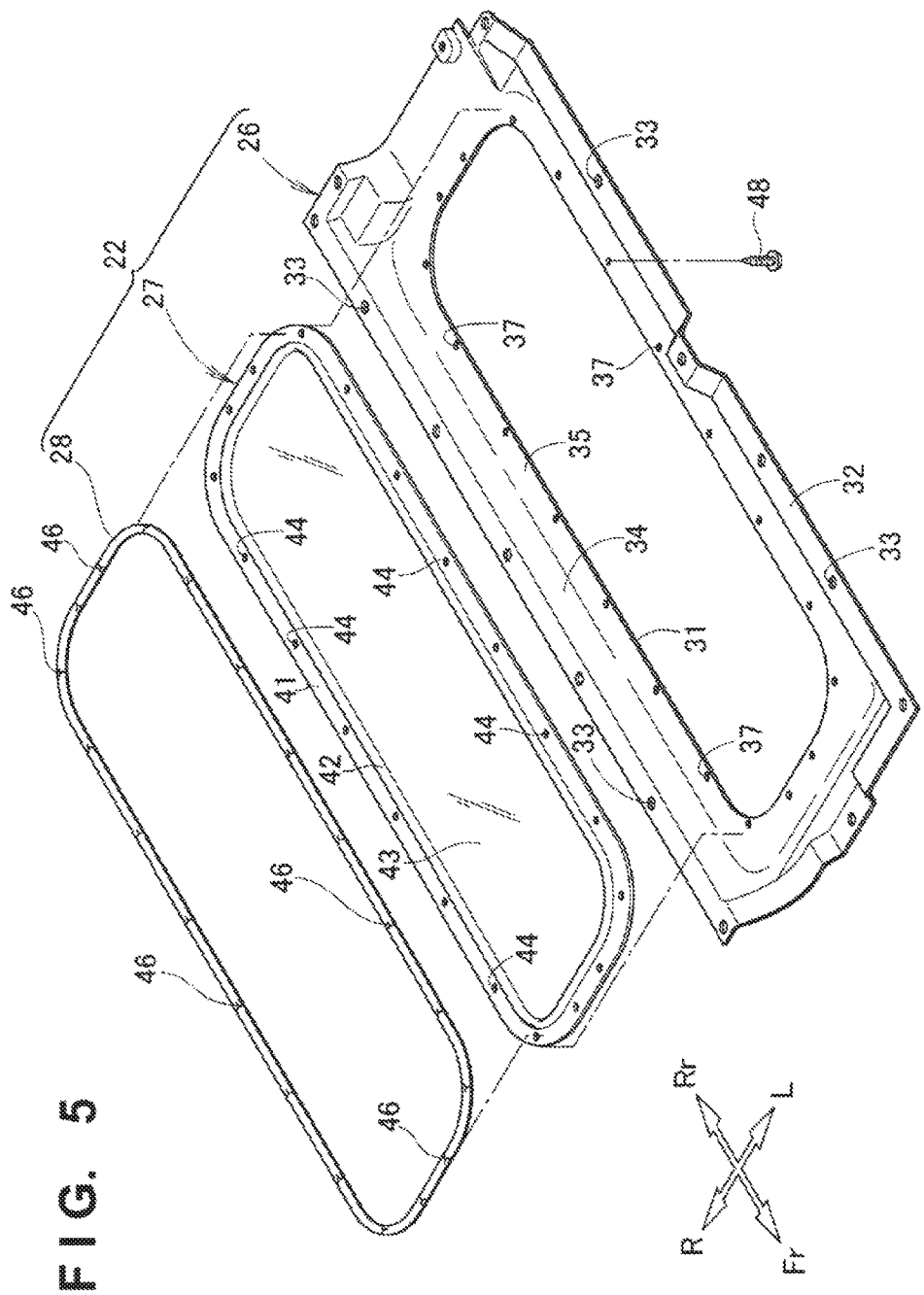
FIG. 5 is an exploded perspective view showing the right undercover in FIG. 4.
Figure 6:
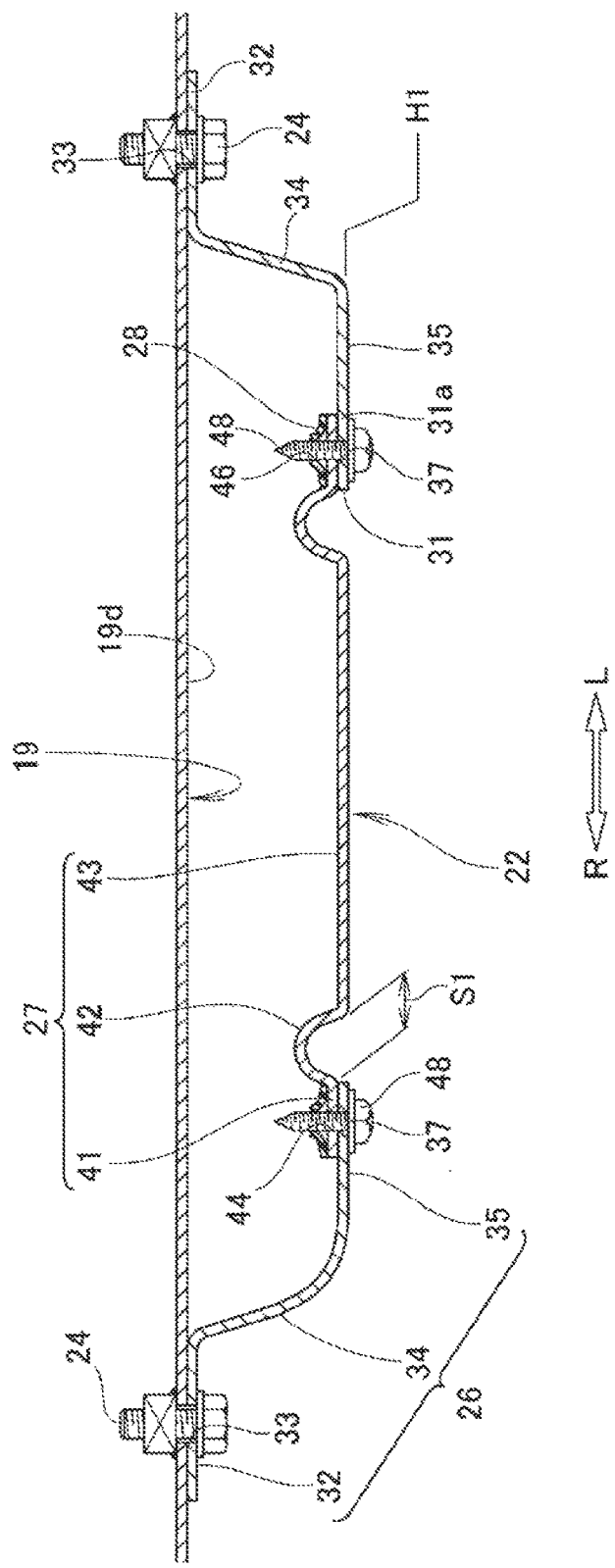
FIG. 6 is a sectional view taken along a line 6-6 in FIG. 1.

As shown in FIGS. 5 and 6, the cover portion 26 is formed into an almost rectangular shape in the plan view by, for example, a polypropylene resin and extends in the vehicle longitudinal direction.

The cover portion 26 includes the cover frame portion 32 formed into a rectangular frame shape along the right mounting portion 19d of the underpanel 19, a cover wall portion 34 jutting downward from the inner perimeter of the cover frame portion 32, and a cover bottom portion 35 jutting inward almost horizontally from the lower end of the cover wall portion 34.

The plurality of mounting holes 33 are formed in the cover frame portion 32 along the edge direction of the cover frame portion 32. The cover bottom portion 35 includes the opening portion 31 formed at the center, an opening edge 31a that forms the opening portion 31, and a plurality of mounting holes 37 formed along the opening edge 31a.

The opening portion 31 is provided at the center of the cover portion 26 in the vehicle width direction, and the lowering portion 27 is arranged in the opening portion 31.

The lowering portion 27 is formed into an almost rectangular shape in the plan view by, for example, a thermoplastic elastomer (TPS) and extends in the vehicle longitudinal direction. The lowering portion 27 includes an outer peripheral portion 41 formed into an almost rectangular frame shape along the cover bottom portion 35, a deformed portion 42 formed along the inner edge of the outer peripheral portion 41, and a lowering bottom portion (bottom portion) 43 formed on the inner edge of the deformed portion 42.

That is, the lowering bottom portion 43 is arranged inside the outer peripheral portion 41. In addition, the outer peripheral portion 41 and the lowering bottom portion 43 are connected by the deformed portion 42. A plurality of mounting holes 44 are formed in the outer peripheral portion 41. The lowering portion 27 is made of the thermoplastic elastomer so that the lowering portion 27 (in particular, the deformed portion 42) is formed to be elastically deformable like rubber.

The mount frame portion 28 is formed into a frame shape along the outer peripheral portion 41 of the lowering portion 27. The mount frame portion 28 includes a plurality of engaging portions 46.

The outer peripheral portion 41 of the lowering portion 27 is overlaid from above on the cover bottom portion 35 of the cover portion 26. In addition, the mount frame portion 28 is overlaid from above on the outer peripheral portion 41. Bolts 48 are inserted into the mounting holes 37 of the cover bottom portion 35 and the mounting holes 44 of the outer peripheral portion 41 and threadably connected to the engaging portions 46 of the mount frame portion 28.

Figure 7:
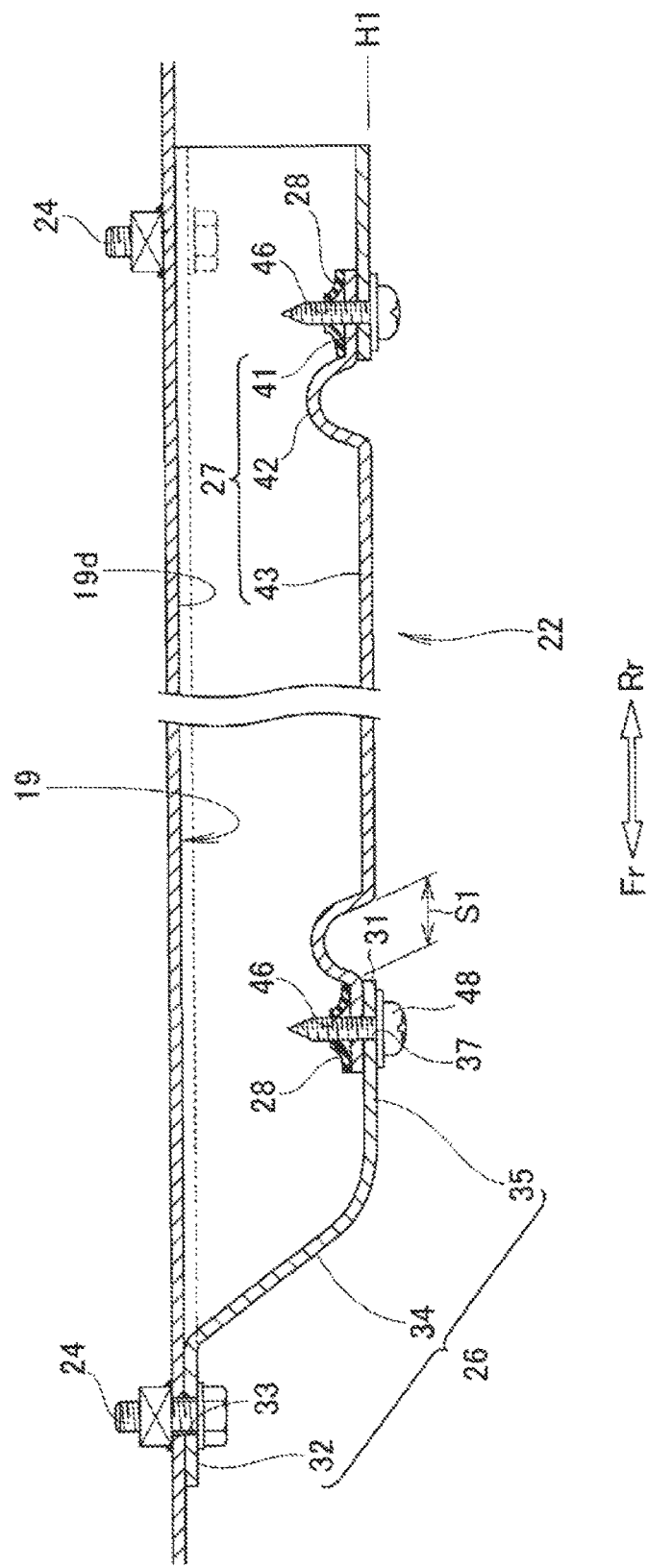
FIG. 7 is a sectional view taken along a line 7-7 in FIG. 1.

As shown in FIGS. 6 and 7, the outer peripheral portion 41 of the lowering portion 27 is sandwiched between the mount frame portion 28 and the cover bottom portion 35 of the cover portion 26. The outer peripheral portion 41 is thus provided on the cover bottom portion 35. In this state, the deformed portion 42 and the lowering bottom portion 43 of the lowering portion 27 are arranged in the opening portion 31 of the cover portion 26. The deformed portion 42 is formed into a frame shape along the opening portion 31 (see FIG. 3 as well).

Since the deformed portion 42 and the lowering bottom portion 43 are arranged in the opening portion 31, the deformed portion 42 and the lowering bottom portion 43 are provided only in a central portion 26a (see FIG. 3) of the cover portion 26 in the vehicle width direction. Additionally, the deformed portion 42 and the lowering bottom portion 43 extend in the vehicle longitudinal direction such that the vehicle longitudinal direction becomes their longitudinal direction (see FIG. 1).

The lowering bottom portion 43 is arranged at a fixed position H1 on almost the same plane as the cover bottom portion 35 (to be almost flush with the cover bottom portion 35). The deformed portion 42 is formed endlessly into an almost upward curved sectional shape. More specifically, the deformed portion 42 has a margin to a distance S1 between the lowering bottom portion 43 and the outer peripheral portion 41 and is thus formed to be elastically deformable.

The deformed portion 42 has rigidity to hold the curved shape and elastic deformability to stretch from the curved shape to a linear shape.

Figure 8:
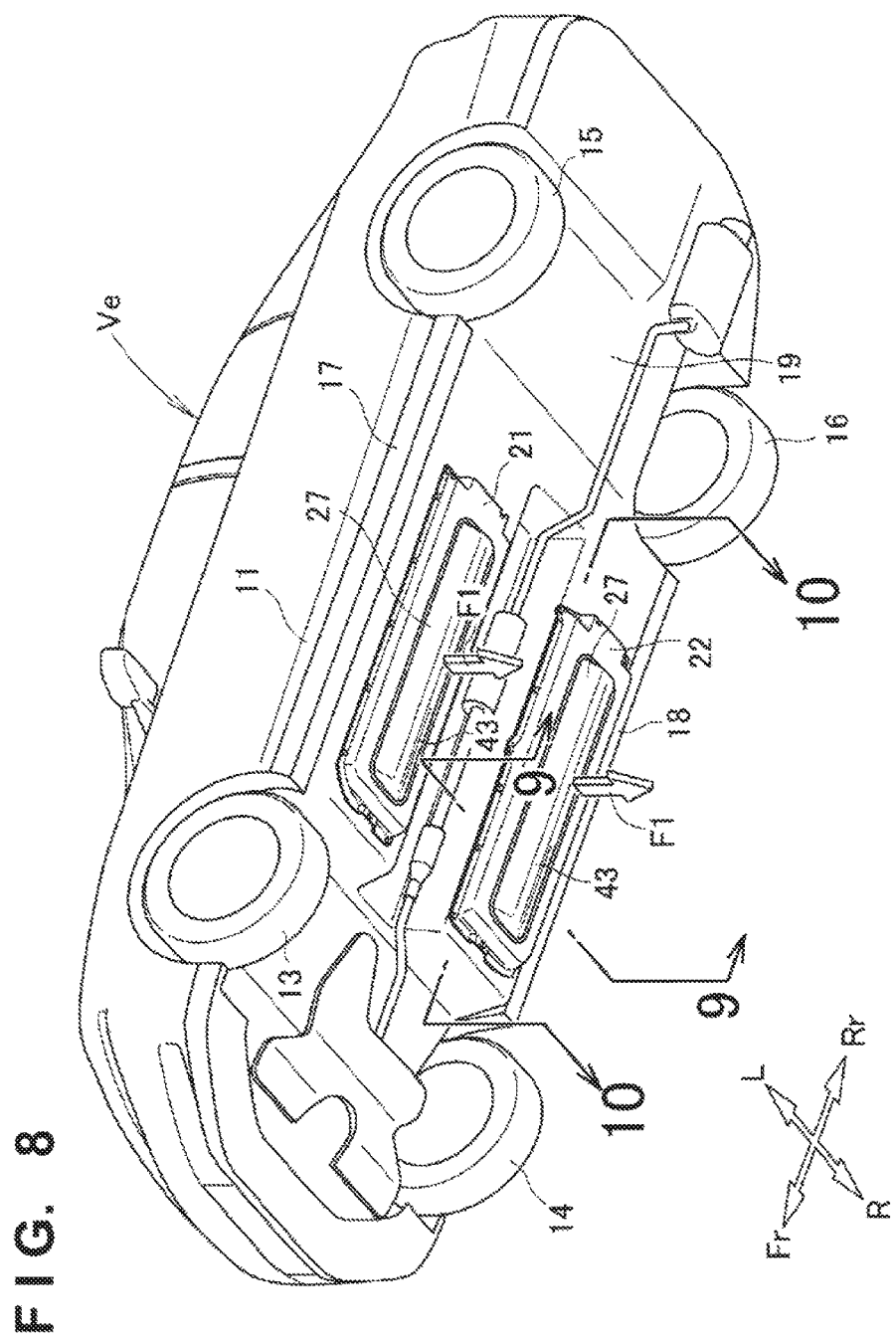
FIG. 8 is a perspective view showing a state in which a lowering portion provided in the vehicle understructure according to the first embodiment is lowered.

As shown in FIG. 8, during driving of the vehicle Ve (more specifically, during driving at a medium or high speed), a negative pressure is generated between the road surface and the left undercover 21 or between the road surface and the right undercover 22. When the negative pressure is generated under the left undercover 21 or the right undercover 22, a downward force F1 acts on the lowering bottom portion 43 of the left undercover 21 or the right undercover 22.

By the downward force F1 acting on the lowering bottom portion 43, the deformed portion 42 deforms (stretches) into a linear shape. The lowering bottom portion 43 lowers from the underpanel 19.

Figure 9:
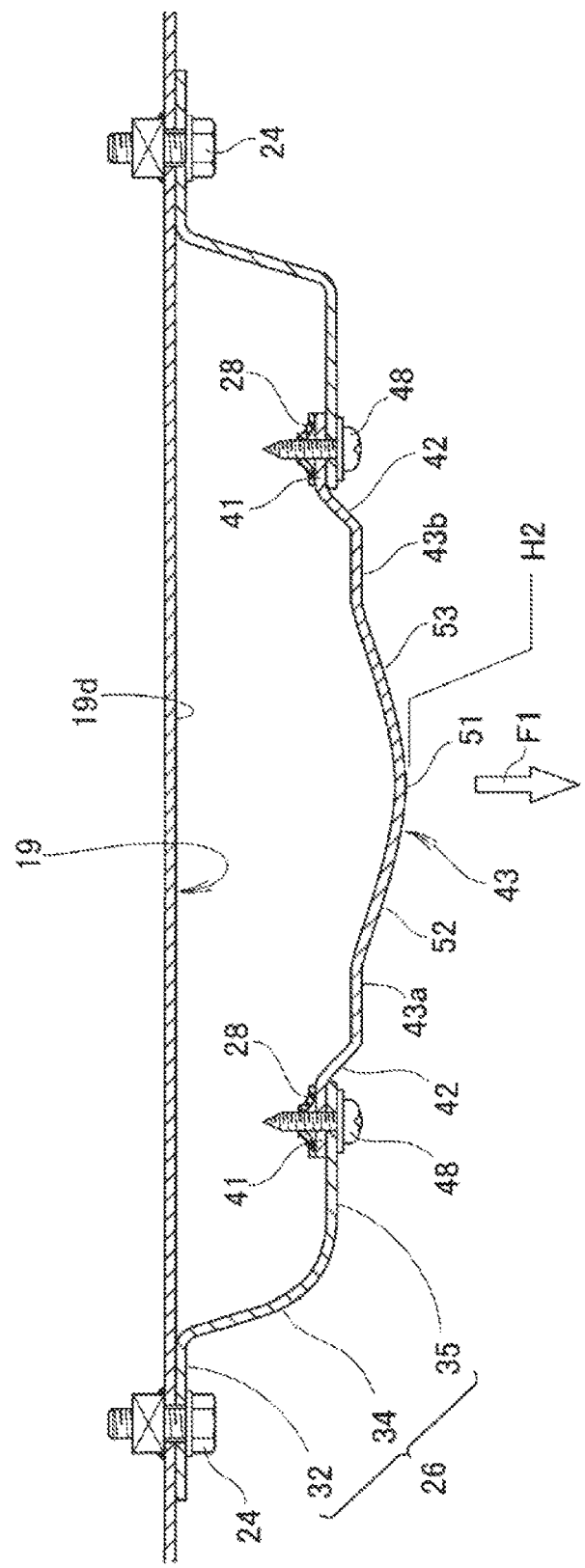
FIG. 9 is a sectional view taken along a line 9-9 in FIG. 8.
Figure 10:
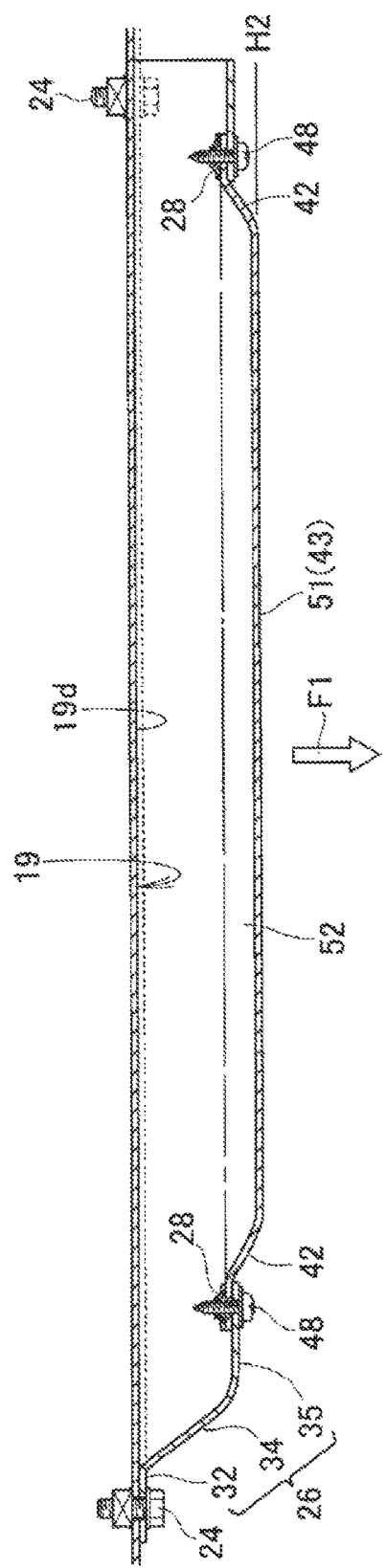
FIG. 10 is a sectional view taken along a line 10-10 in FIG. 8.

As shown in FIGS. 9 and 10, when the lowering bottom portion 43 of the right undercover 22 lowers from the right mounting portion 19d of the underpanel 19, the deformed portion 42 fully stretches into a linear shape. This suppresses the deformation of the deformed portion 42 and regulates the downward movement of the lowering bottom portion 43.

In this state, an apex 51 of the lowering bottom portion 43 is arranged at a low position H2 lower than the fixed position H1.

It is therefore possible to satisfactorily generate the negative pressure between the right undercover 22 and the road surface and ensure the stability of the vehicle Ve.

On the other hand, in a state in which the vehicle Ve is at a standstill or is driving at a low speed, the negative pressure (that is, the downward force F1) is eliminated from the lowering bottom portion 43 or reduced. The deformed portion 42 has rigidity to hold the curved shape. For this reason, the deformed portion 42 is restored to the shape before the deformation by the elastic force of the deformed portion 42 and kept in the shape before the deformation.

Hence, the lowering bottom portion 43 is raised from the low position H2 to the fixed position H1 (see FIGS. 6 and 7) by the restoring force of the deformed portion 42 and arranged on almost the same plane as the cover bottom portion 35. A high ground clearance can thus be ensured for the vehicle Ve.

The deformed portion 42 is formed into an almost curved sectional shape. Hence, when the downward force F1 acts on the lowering bottom portion 43, the deformed portion 42 can smoothly be stretched (deformed) from the almost curved sectional shape to the linear shape. The lowering bottom portion 43 can thus be smoothly lowered to the low position H2 by the downward force F1 acting on the lowering bottom portion 43.

On the other hand, when the downward force F1 acting on the lowering bottom portion 43 is eliminated or reduced, the deformed portion 42 can smoothly be restored from the linear shape to the almost curved sectional shape by the elastic force of the deformed portion 42 and maintained in the almost curved sectional shape. The lowering bottom portion 43 can thus be smoothly raised from the low position H2 to the fixed position H1 by the elastic force of the deformed portion 42.

In addition, the lowering bottom portion 43 can be lowered so as to be separated from the outer peripheral portion 41 only by connecting the lowering bottom portion 43 and the outer peripheral portion 41 of the lowering portion 27 by the elastically deformable deformed portion 42. This can simplify the structure to lower the right undercover 22.

A preferable shape of the lowering portion 27 when lowering the lowering bottom portion 43 by the negative pressure generated under the right undercover 22 will be described here.

In a state in which the lowering bottom portion 43 is lowered, the center of the lowering bottom portion 43 in the vehicle width direction lowers from the fixed position H1 to the low position (lowermost position) H2 to form the apex 51. The apex 51 extends linearly in the longitudinal direction of the lowering portion 27 (that is, the vehicle longitudinal direction) (see FIG. 8 as well).

In addition, the apex 51 is formed at the center of the lowering bottom portion 43 in the vehicle width direction. Accordingly, an outer sloping portion 52 jutting from the apex 51 to the side of an outside portion (one of the two side portions of the lowering portion) 43a of the lowering bottom portion 43 is formed, and an inner sloping portion 53 jutting from the apex 51 to the side of an inside portion (the other of the two side portions of the lowering portion) 43b of the lowering bottom portion 43 is formed.

In other words, in the state in which the lowering bottom portion 43 is lowered, the lowering portion 27 includes the apex 51, the outer sloping portion 52, and the inner sloping portion 53.

Hence, in the state in which the lowering bottom portion 43 is lowered, the lowering bottom portion 43 is formed into an almost ship's bottom-like sectional shape by the apex 51, the outer sloping portion 52, and the inner sloping portion 53.

An example in which the aerodynamic performance of the vehicle Ve is improved by the left undercover 21 and the right undercover 22 will be described next with reference to FIG. 11. Note that the left undercover 21 will be explained as a representative example with reference to FIG. 11 for easy understanding of the aerodynamic performance.

Figure 11:
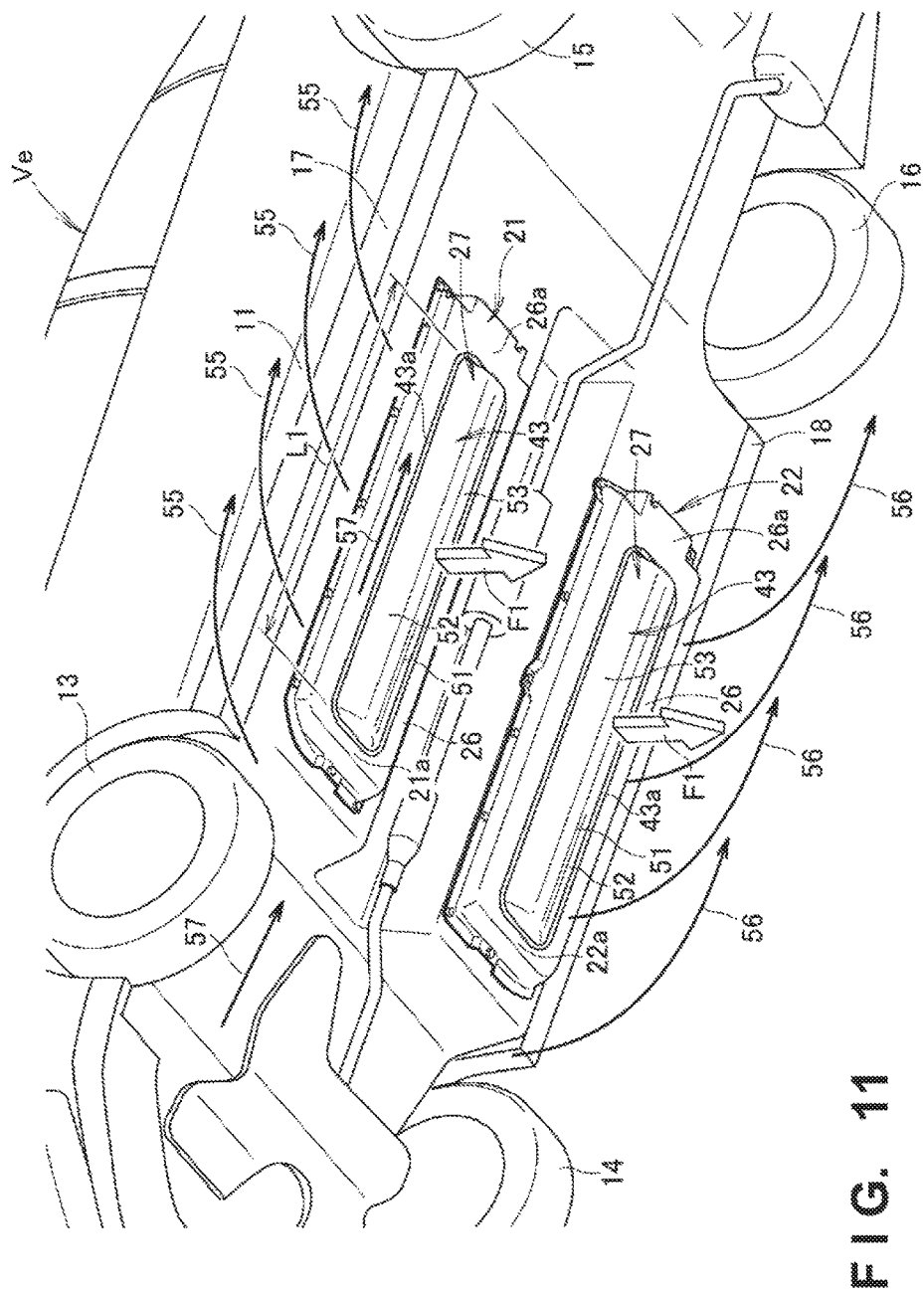
FIG. 11 is a view for explaining an example in which the aerodynamic performance of a vehicle is improved by the vehicle understructure according to the first embodiment.

As shown in FIG. 11, during driving of the vehicle Ve (in particular, during driving at a medium or high speed), an airflow 55 is generated, which flows from the left front wheel 13 to the rear side of the vehicle outward in the vehicle width direction.

Similarly, an airflow 56 is generated, which flows from the right front wheel 14 to the rear side of the vehicle outward in the vehicle width direction. The airflows 55 and 56 are considered to increase the air resistance.

To prevent this, the left undercover 21 and the right undercover 22 are provided on the underpanel 19.

In the left undercover 21, the lowering portion 27 extends in the vehicle longitudinal direction such that the vehicle longitudinal direction becomes the longitudinal direction of the lowering portion 27. By the driving of the vehicle Ve at a medium or high speed, the downward force F1 acts on the lowering bottom portion 43 of the lowering portion 27, and the center of the lowering bottom portion 43 in the vehicle width direction lowers to the lowermost position. Hence, the apex 51 is formed at the center of the lowering bottom portion 43 in the vehicle width direction. The formed apex 51 extends linearly in a length L1 in the longitudinal direction of the lowering portion 27 (that is, in the vehicle longitudinal direction).

It is therefore possible to ensure the negative pressure between the lowering portion 27 and the road surface in a sufficient length from the left front wheel 13 to the rear side of the vehicle. When the length of the negative pressure is sufficiently ensured, the airflow 55 that flows from the left front wheel 13 to the rear side of the vehicle outward in the vehicle width direction can be attracted to the side of the vehicle Ve, and the spread of the airflow 55 outward in the vehicle width direction can be suppressed.

By suppressing the spread of the airflow 55 in this way, an air resistance generated by the airflow 55 flowing from the left front wheel 13 can suitably be reduced, and the aerodynamic performance of the vehicle Ve can be improved.

The lowering portion 27 is provided only in the central portion 26a of the left undercover 21 (more specifically, the cover portion 26) in the vehicle width direction. Hence, the lowering portion 27 is provided on the rear side of the vehicle with respect to the left front wheel 13.

The airflow 55 flowing from the left front wheel 13 to the rear side of the vehicle spreads outward in the vehicle width direction. When the lowering portion 27 is provided on the rear side of the vehicle with respect to the left front wheel 13, the airflow 55 spreading outward in the vehicle width direction can efficiently be attracted to the negative pressure side of the lowering portion 27.

It is therefore possible to suppress the spread of the airflow 55 outward in the vehicle width direction and more suitably reduce the air resistance.

When the lowering portion 27 is provided only in the central portion 26a of the left undercover 21 (more specifically, the cover portion 26) in the vehicle width direction, the lowering portion 27 can be suppressed small in the vehicle width direction. This makes it possible to efficiently cause the airflow 57 to flow to the rear side of the vehicle during the driving of the vehicle Ve at a medium or high speed and improve the aerodynamic performance of the vehicle Ve.

The lowering portion 27 includes the apex 51, the outer sloping portion 52, and the inner sloping portion 53. The apex 51 of the lowering portion 27 is lowered to the lowermost position at the center of the left undercover 21 in the vehicle width direction in a state in which the apex 51 extends in the longitudinal direction. The outer sloping portion 52 of the lowering portion 27 juts from the apex 51 to the side of the outside portion 43a of the lowering bottom portion 43.

Hence, during the driving of the vehicle Ve at a medium or high speed, the negative pressure is generated under the apex 51 and the outer sloping portion 52. This makes it possible to attract the airflow 55 spreading outward in the vehicle width direction to the side of the apex 51 and the outer sloping portion 52 to suppress the spread of the airflow 55 outward in the vehicle width direction and suitably reduce the air resistance.

In addition, the left undercover 21 is provided on the left side of the underpanel 19 in the vehicle width direction, and the right undercover 22 is provided on the right side of the underpanel 19 in the vehicle width direction. Hence, the airflow 55 flowing from the left front wheel 13 can be attracted to the side of the vehicle Ve by the lowering portion 27 on the left side, and the spread of the airflow 55 outward in the vehicle width direction can be suppressed.

The airflow 56 flowing from the right front wheel 14 can also be attracted to the side of the vehicle Ve by the lowering portion 27 on the right side, and the spread of the airflow 56 outward in the vehicle width direction can be suppressed.

It is therefore possible to suitably reduce the air resistance generated by the airflows 55 and 56 flowing from the left front wheel 13 and the right front wheel 14 and improve the aerodynamic performance of the vehicle Ve.

The second and third embodiments will be described next with reference to FIGS. 12 to 20. Note that the same reference numerals as in the first embodiment denote the same or similar members in the second and third embodiments, and a detailed description thereof will be omitted.

Second Embodiment

A vehicle understructure 60 according to the second embodiment will be described.

Figure 12:
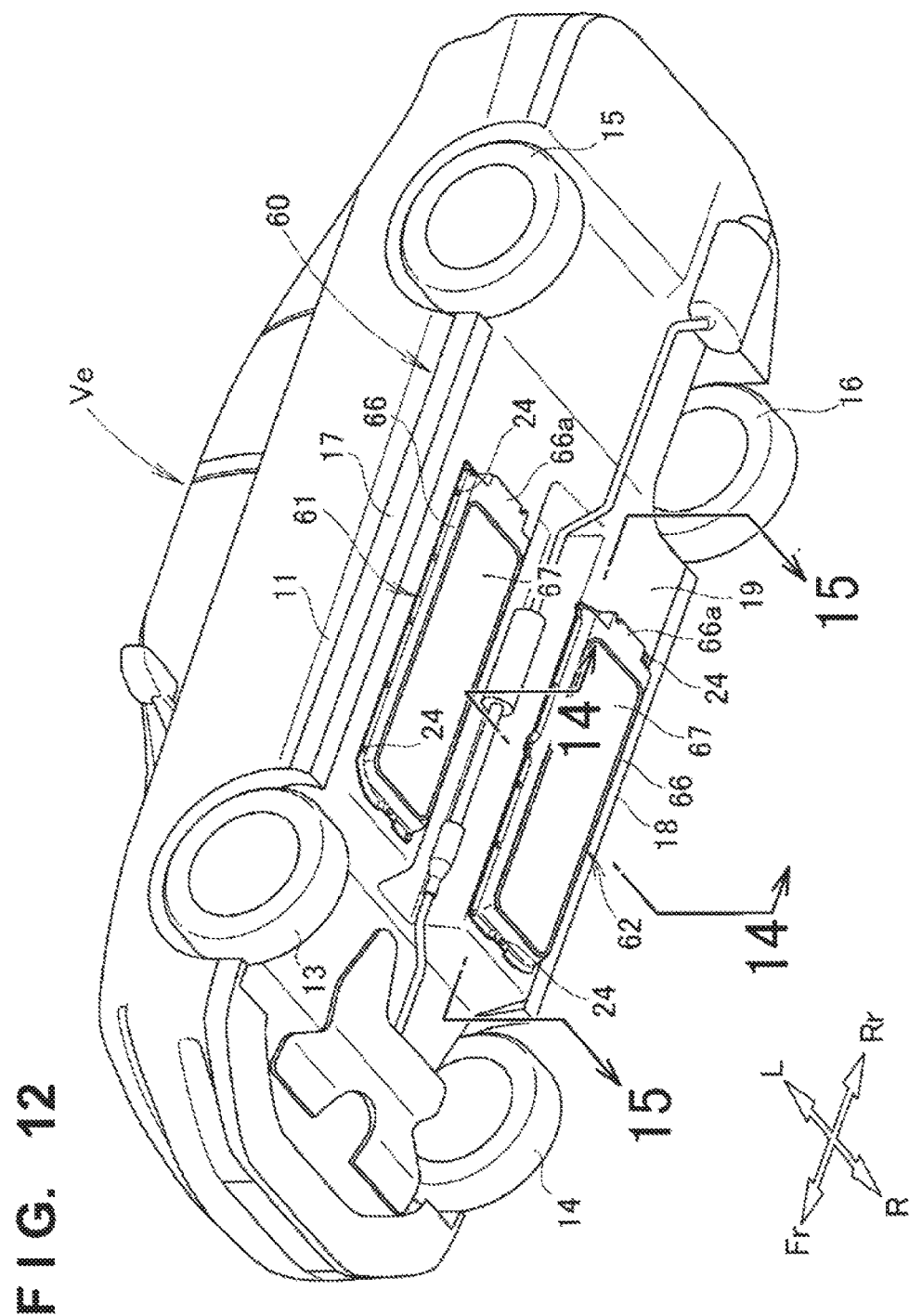
FIG. 12 is a perspective view showing a vehicle understructure according to the second embodiment of the present invention.

As shown in FIG. 12, the vehicle understructure 60 includes a left undercover 61 and a right undercover 62 in place of the left undercover 21 and the right undercover 22 of the first embodiment, and the rest of the arrangement is the same as in the vehicle understructure 10 according to the first embodiment.

As in the first embodiment, the left undercover 61 and the right undercover 62 are respectively provided on the left and right sides of an underpanel 19 in the vehicle width direction at an interval in the vehicle width direction.

The left undercover 61 and the right undercover 62 are bilaterally symmetrical members. The right undercover 62 will be described in detail. The constituent elements of the left undercover 61 are denoted by the same reference numerals as those for the right undercover 62, and a detailed description of the left undercover 61 will be omitted.

Figure 13:
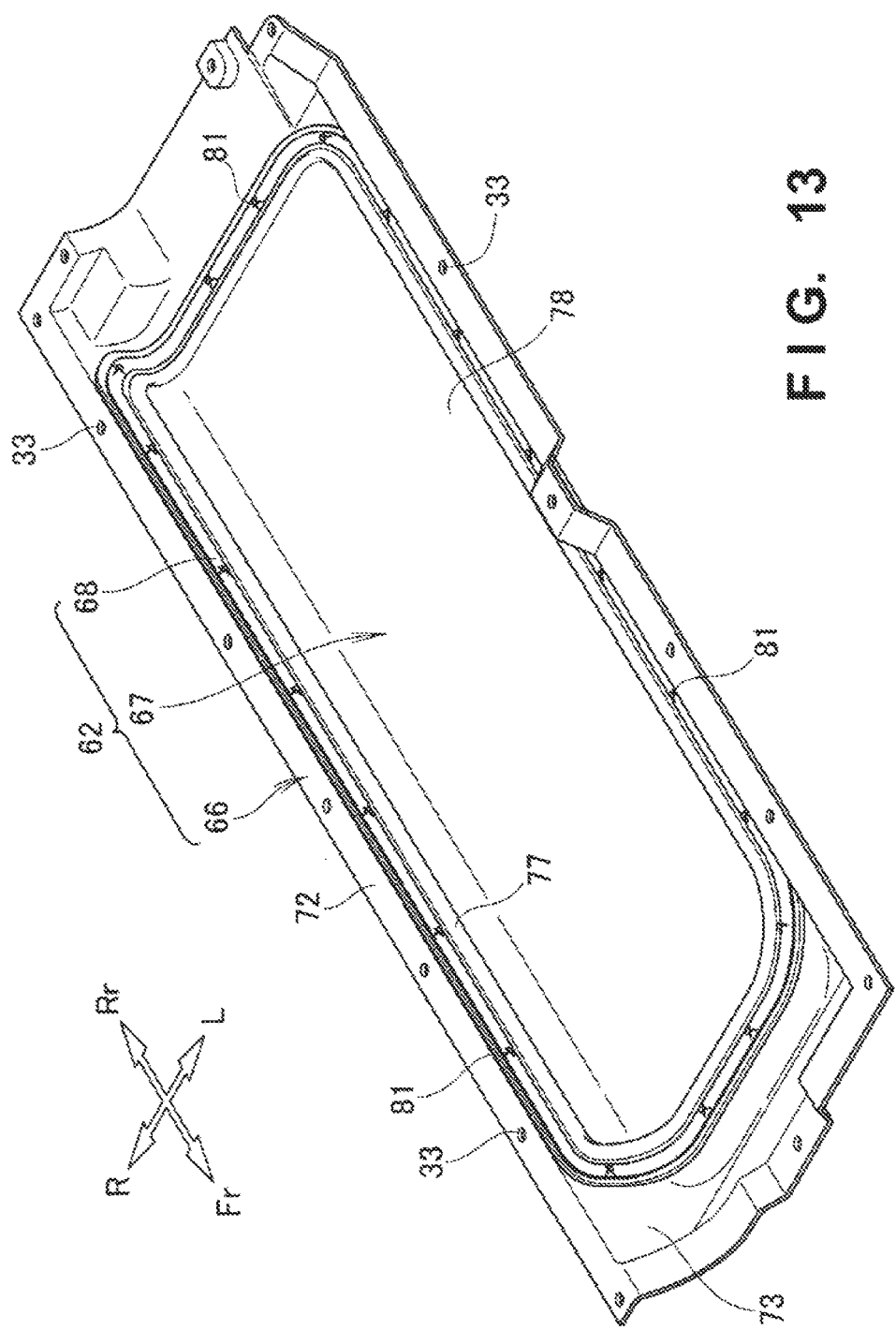
FIG. 13 is a perspective view showing a state in which a right undercover in FIG. 12 is viewed from the upper side.

As shown in FIG. 13, the right undercover 62 includes a cover portion 66 mounted on a right mounting portion 19d of the underpanel 19 by a plurality of bolts 24 (see FIG. 12), a lowering portion 67 arranged in an opening portion 71 (see FIG. 14) of the cover portion 66, and a mount frame portion 68 that holds the lowering portion 67 in the cover portion 66.

The right undercover 62 is formed such that the lowering portion 67 becomes larger than that in the right undercover 22 according to the first embodiment.

Figure 14:
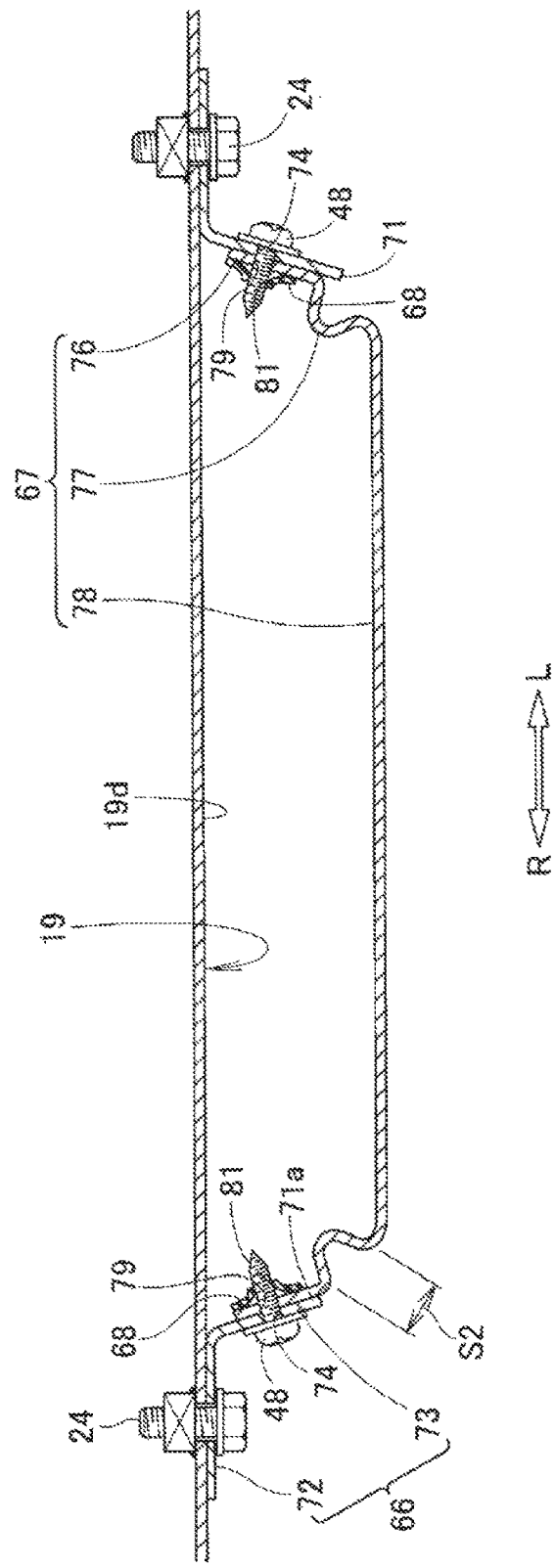
FIG. 14 is a sectional view taken along a line 14-14 in FIG. 12.
Figure 15:
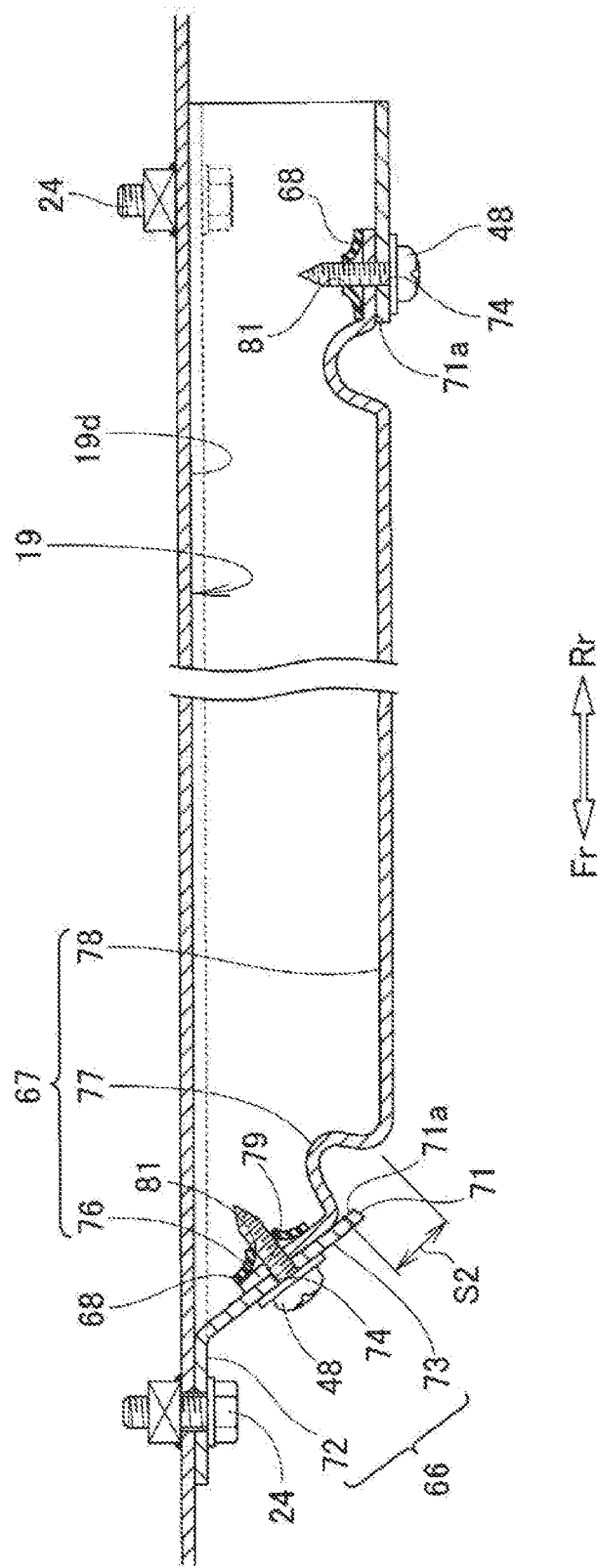
FIG. 15 is a sectional view taken along a line 15-15 in FIG. 12.

As shown in FIGS. 14 and 15, the cover portion 66 is formed into an almost rectangular shape in the plan view by, for example, a polypropylene resin and extends in the vehicle longitudinal direction, like the cover portion 26 according to the first embodiment.

The cover portion 66 includes a cover frame portion 72 formed into a rectangular frame shape along the right mounting portion 19d of the underpanel 19, and a cover wall portion 73 jutting downward from the inner perimeter of the cover frame portion 72.

The cover frame portion 72 is formed like the cover frame portion 32 according to the first embodiment. The cover wall portion 73 includes an opening edge 71a that forms the opening portion 71, and a plurality of mounting holes 74 formed along the opening edge 71a. The opening portion 71 is provided at the center of the cover portion 66 in the vehicle width direction, and the lowering portion 67 is arranged in the opening portion 71.

Since the opening portion 71 is formed in the cover wall portion 73, the opening portion 71 is formed to be larger than the opening portion 31 according to the first embodiment.

The lowering portion 67 is formed into an almost rectangular shape in the plan view by, for example, a thermoplastic elastomer (TPS) and extends in the vehicle longitudinal direction, like the lowering portion 27 according to the first embodiment. The lowering portion 67 includes an outer peripheral portion 76 formed into an almost rectangular frame shape along the cover wall portion 73, a deformed portion 77 formed along the inner edge of the cover wall portion 73, and a lowering bottom portion (bottom portion) 78 formed on the inner edge of the deformed portion 77.

That is, the lowering bottom portion 78 is arranged inside the outer peripheral portion 76. In addition, the outer peripheral portion 76 and the lowering bottom portion 78 are connected by the deformed portion 77. A plurality of mounting holes 79 are formed in the outer peripheral portion 76. The lowering portion 67 is made of the thermoplastic elastomer so that the lowering portion 67 (in particular, the deformed portion 77) is formed to be elastically deformable like rubber.

The mount frame portion 68 is formed into a frame shape along the outer peripheral portion 76 of the lowering portion 67. The mount frame portion 68 includes a plurality of engaging portions 81.

The outer peripheral portion 76 of the lowering portion 67 is overlaid from inside on the cover wall portion 73 of the cover portion 66. In addition, the mount frame portion 68 is overlaid from inside on the outer peripheral portion 76. Bolts 48 are inserted into the mounting holes 74 of the cover wall portion 73 and the mounting holes 79 of the outer peripheral portion 76 and threadably connected to the engaging portions 81 of the mount frame portion 68.

The outer peripheral portion 76 of the lowering portion 67 is sandwiched between the mount frame portion 68 and the cover wall portion 73 of the cover portion 66. The outer peripheral portion 76 is thus provided on the cover wall portion 73. In this state, the deformed portion 77 and the lowering bottom portion 78 of the lowering portion 67 are arranged in the opening portion 71 of the cover portion 66. The deformed portion 77 is formed into a frame shape along the opening portion 71 (see FIG. 13 as well).

Since the deformed portion 77 and the lowering bottom portion 78 are arranged in the opening portion 71, the deformed portion 77 and the lowering bottom portion 78 are provided only in a central portion 66a (see FIG. 12) of the cover portion 66 in the vehicle width direction. Additionally, the deformed portion 77 and the lowering bottom portion 78 extend in the vehicle longitudinal direction such that the vehicle longitudinal direction becomes their longitudinal direction (see FIG. 12).

The lowering bottom portion 78 is formed to be flat almost in the horizontal direction near the lower portion of the cover wall portion 73. The deformed portion 77 is formed endlessly into an almost inward curved sectional shape. More specifically, the deformed portion 77 has a margin to a distance S2 between the lowering bottom portion 78 and the outer peripheral portion 76 and is thus formed to be elastically deformable.

The deformed portion 77 has rigidity to hold the curved shape and elastic deformability to stretch from the curved shape to a linear shape.

Figure 16:
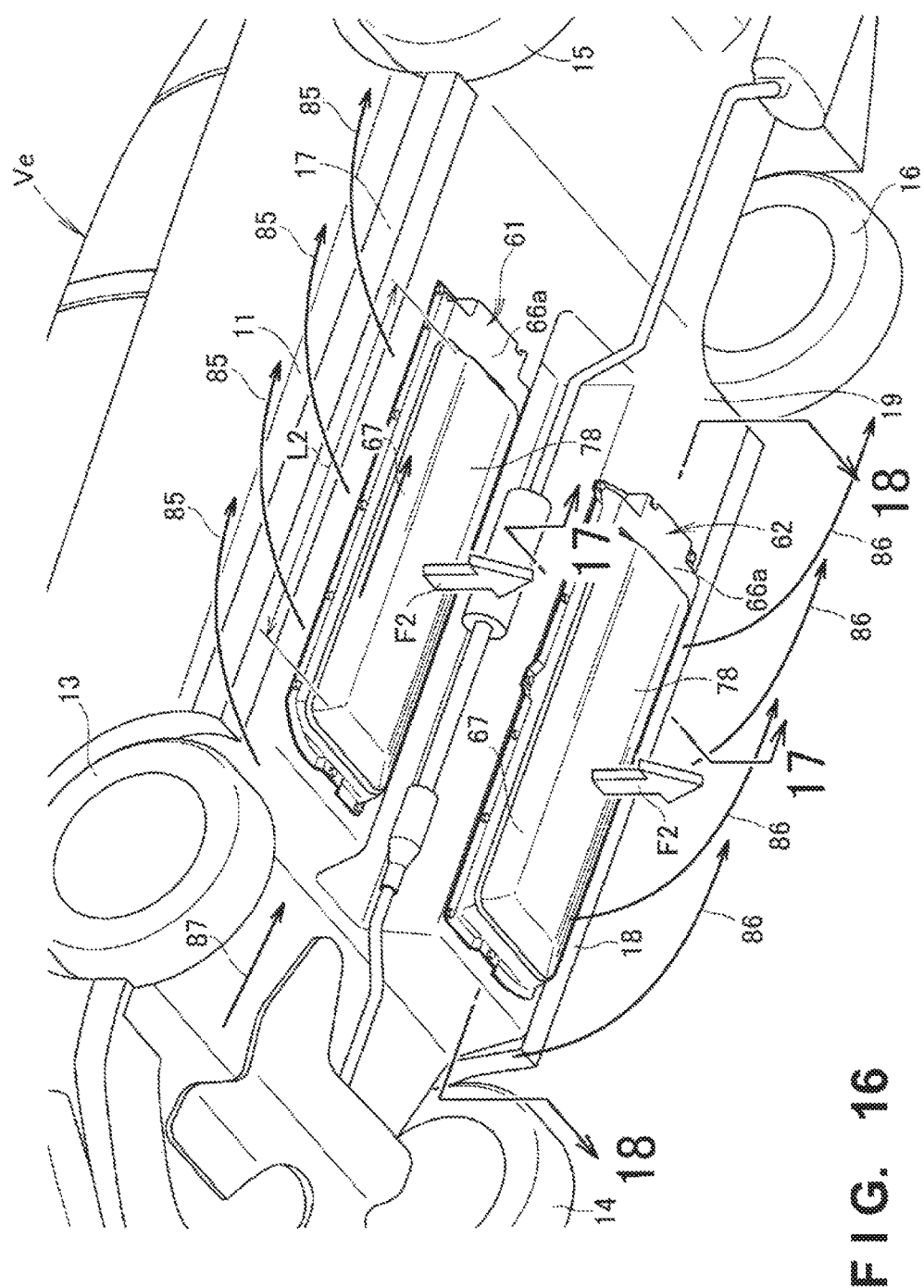
FIG. 16 is a perspective view showing a state in which a lowering portion provided in the vehicle understructure according to the second embodiment is lowered.

As shown in FIG. 16, during driving of a vehicle Ve at a medium or high speed, a negative pressure is generated between the road surface and the left undercover 61 or between the road surface and the right undercover 62. When the negative pressure is generated under the left undercover 61 or the right undercover 62, a downward force F2 acts on the lowering bottom portion 78 of the left undercover 61 or the right undercover 62.

By the downward force F2 acting on the lowering bottom portion 78, the deformed portion 77 deforms (stretches) into a linear shape. The lowering bottom portion 78 lowers from the underpanel 19.

Figure 17:
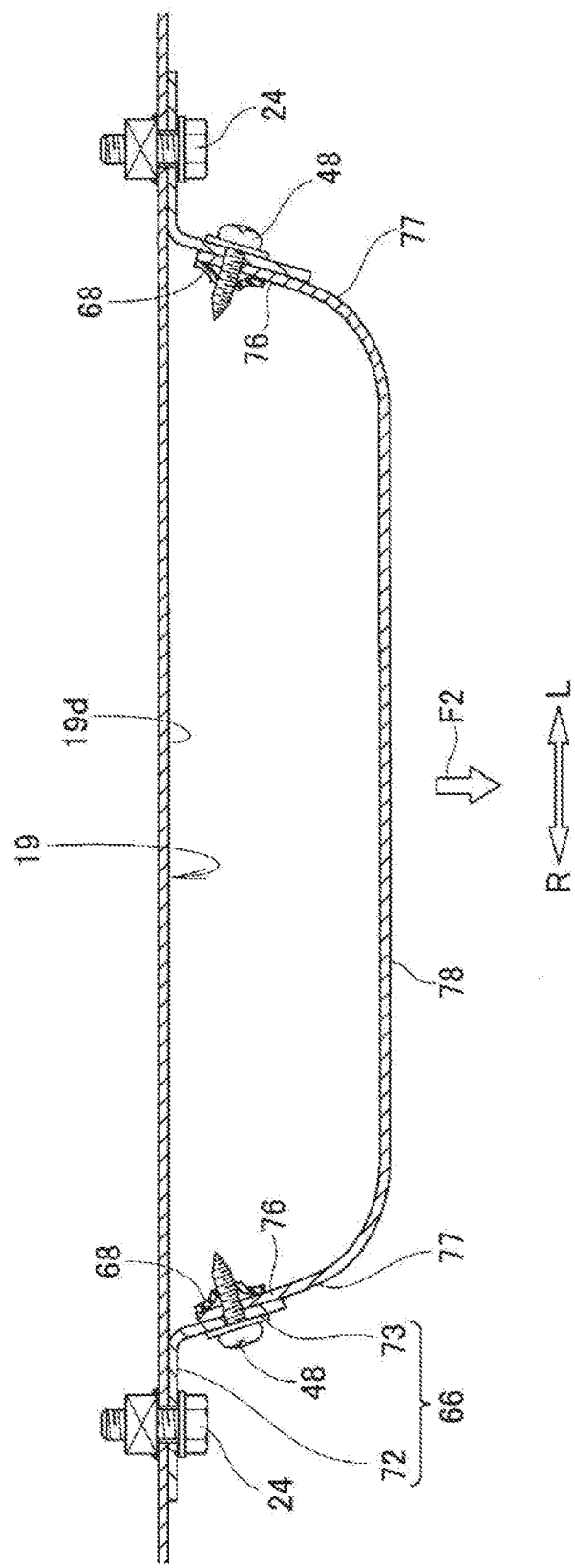
FIG. 17 is a sectional view taken along a line 17-17 in FIG. 16.
Figure 18:
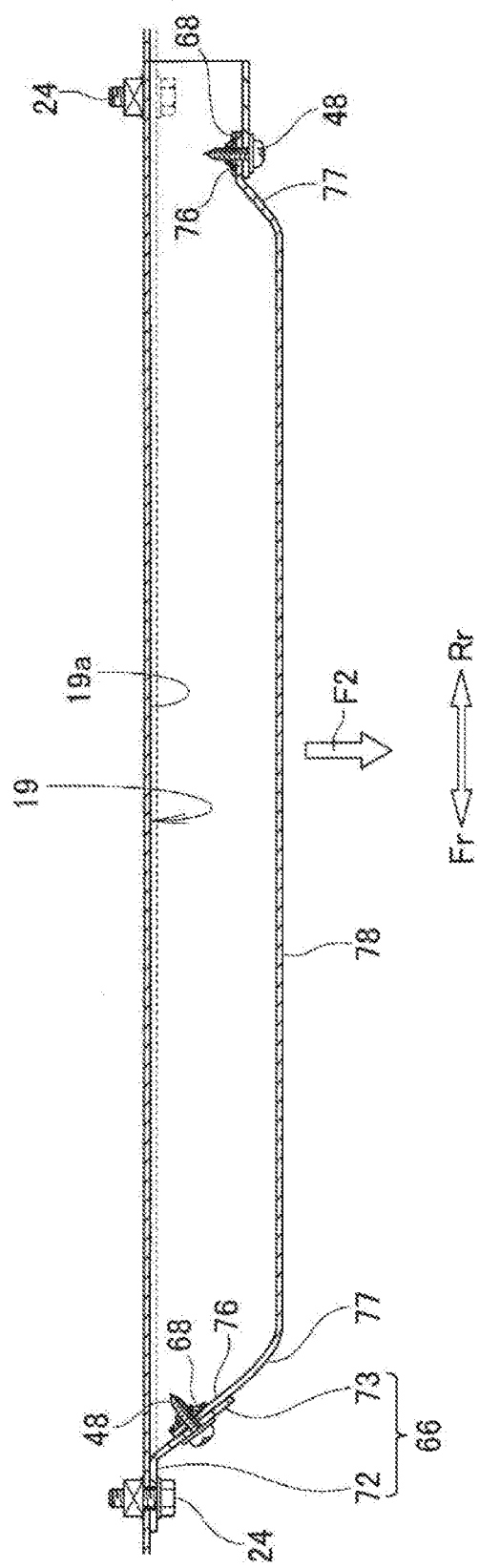
FIG. 18 is a sectional view taken along a line 18-18 in FIG. 16.

As shown in FIGS. 17 and 18, when the lowering bottom portion 78 of the right undercover 62 lowers from the right mounting portion 19d of the underpanel 19, the deformed portion 77 fully stretches into a linear shape. This suppresses the deformation of the deformed portion 77 and regulates the downward movement of the lowering bottom portion 78.

On the other hand, in a state in which the vehicle Ve is at standstill or is driving at a low speed, the negative pressure is eliminated from the lowering bottom portion 78. The deformed portion 77 has rigidity to hold the curved shape. For this reason, the lowering bottom portion 78 is returned to the flat shape near the lower portion of the cover wall portion 73 by the restoring force of the deformed portion 77 (see FIGS. 14 and 15).

A preferable shape of the lowering portion 67 when lowering the lowering bottom portion 78 by the negative pressure generated under the lowering bottom portion 78 will be described here.

The whole lowering bottom portion 78 lowers to the lowermost position in a state in which the lowering bottom portion 78 is kept almost flat (or in a state in which the lowering bottom portion 78 is kept slightly curved downward). The lowered lowering bottom portion 78 extends in the longitudinal direction of the lowering portion 67 (that is, in the vehicle longitudinal direction) (see FIG. 16 as well).

An example in which the aerodynamic performance of the vehicle Ve is improved by the left undercover 61 and the right undercover 62 will be described next with reference to FIG. 16. Note that the left undercover 61 will be explained as a representative example with reference to FIG. 16 for easy understanding of the aerodynamic performance.

In the left undercover 61, the lowering portion 67 extends in the vehicle longitudinal direction such that the vehicle longitudinal direction becomes the longitudinal direction of the lowering portion 67. By the driving of the vehicle Ve at a medium or high speed, the downward force F2 acts on the lowering bottom portion 78 of the lowering portion 67, and the center of the lowering bottom portion 78 in the vehicle width direction lowers to the lowermost position. The lowered lowering bottom portion 78 extends in a length L2 in the longitudinal direction of the lowering portion 67 (that is, in the vehicle longitudinal direction).

It is therefore possible to ensure the negative pressure between the lowering portion 67 and the road surface in a sufficient length from a left front wheel 13 to the rear side of the vehicle. When the length of the negative pressure is sufficiently ensured, an airflow 85 that flows from the left front wheel 13 to the rear side of the vehicle outward in the vehicle width direction can be attracted to the side of the vehicle Ve, and the spread of the airflow 85 outward in the vehicle width direction can be suppressed, as in the first embodiment.

By suppressing the spread of the airflow 85 in this way, an air resistance generated by the airflow 85 flowing from the left front wheel 13 can suitably be reduced, and the aerodynamic performance of the vehicle Ve can be improved.

The left undercover 61 is provided on the left side of the underpanel 19 in the vehicle width direction, and the right undercover 62 is provided on the right side of the underpanel 19 in the vehicle width direction. Hence, the airflow 85 flowing from the left front wheel 13 can be attracted to the side of the vehicle Ve by the lowering portion 67 on the left side, and the spread of the airflow 85 outward in the vehicle width direction can be suppressed.

An airflow 86 flowing from a right front wheel 14 can also be attracted to the side of the vehicle Ve by the lowering portion 67 on the right side, and the spread of the airflow 86 outward in the vehicle width direction can be suppressed.

It is therefore possible to suitably reduce the air resistance generated by the airflows 85 and 86 flowing from the left front wheel 13 and the right front wheel 14 and improve the aerodynamic performance of the vehicle Ve.

Third Embodiment

A vehicle understructure 90 according to the third embodiment will be described.

Figure 19:
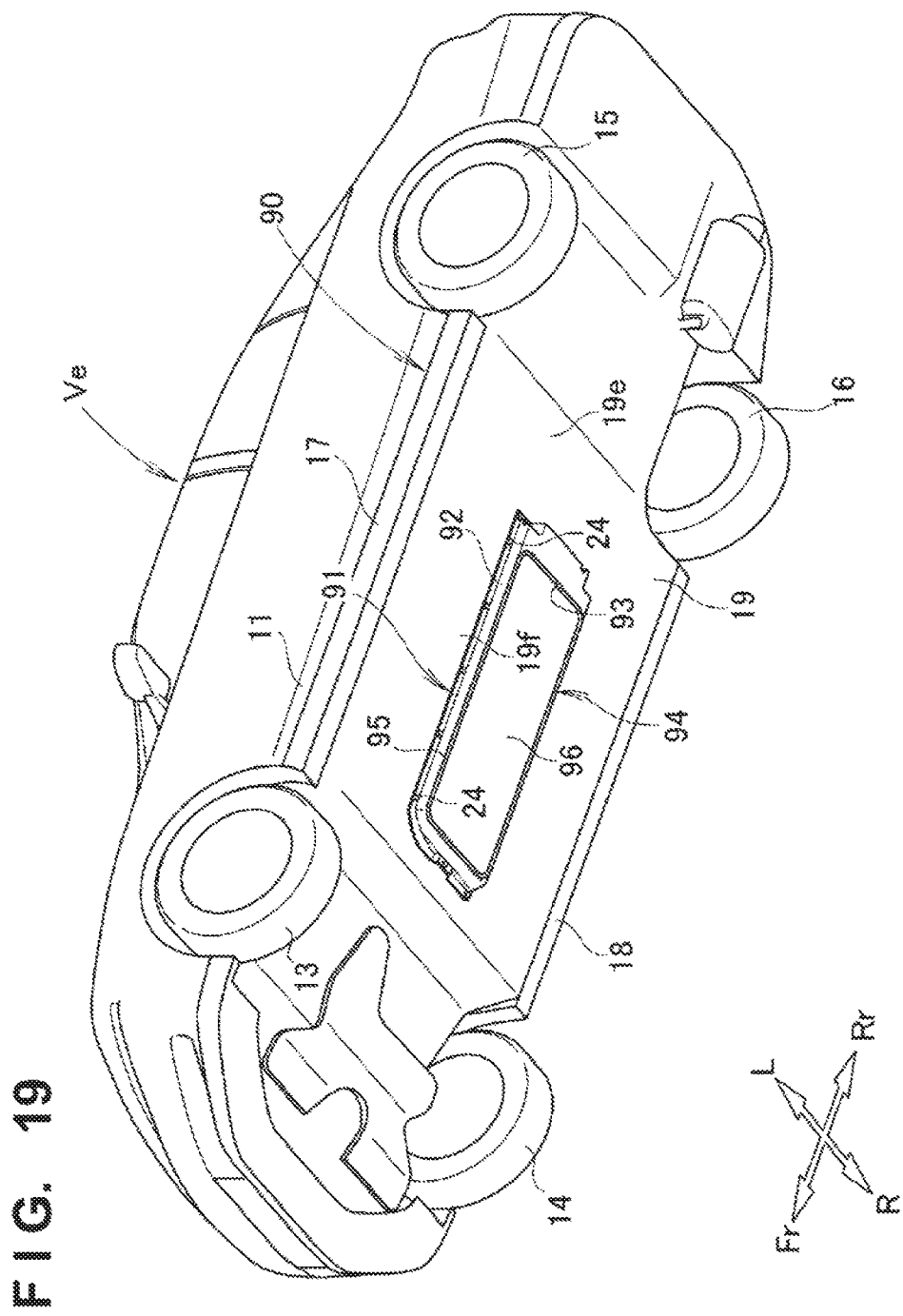
FIG. 19 is a perspective view showing a vehicle understructure according to the third embodiment of the present invention.

As shown in FIG. 19, the vehicle understructure 90 includes an undercover 91 in an underpanel 19 in place of the left undercover 61 and the right undercover 62 of the second embodiment, and the rest of the arrangement is the same as in the vehicle understructure 10 according to the first embodiment.

The underpanel 19 includes, at a center 19e in the vehicle width direction, a central mounting portion (a central portion in the vehicle width direction) 19f between left and right front wheels 13 and 14 and left and right rear wheels 15 and 16. The undercover 91 is provided only in the central mounting portion 19f.

More specifically, the undercover 91 includes a cover portion 92 mounted on the central mounting portion 19f of the underpanel 19 by the plurality of bolts 24, a lowering portion 94 arranged in an opening portion 93 of the cover portion 92, and a mount frame portion (not shown) that holds the lowering portion 94 in the cover portion 92.

The cover portion 92, the lowering portion 94, and the mount frame portion are members formed by extending the cover portion 66, the lowering portion 67, and the mount frame portion 68 according to the second embodiment in the vehicle width direction, which are members similar to the members 66, 67, and 68 according to the second embodiment. Hence, a detailed description of the cover portion 92, the lowering portion 94, and the mount frame portion will be omitted.

The lowering portion 94 is formed into an almost rectangular shape in the plan view by a thermoplastic elastomer (TPS), like the lowering portion 67 of the second embodiment, and includes a deformed portion 95 arranged in the opening portion 93, and a deformed portion 95 lowering bottom portion (bottom portion) 96. That is, the lowering portion 94 is provided only in the central mounting portion 19f.

The deformed portion 95 and the lowering bottom portion 96 are members similar to the deformed portion 77 and the lowering bottom portion 78 according to the second embodiment.

Figure 20:
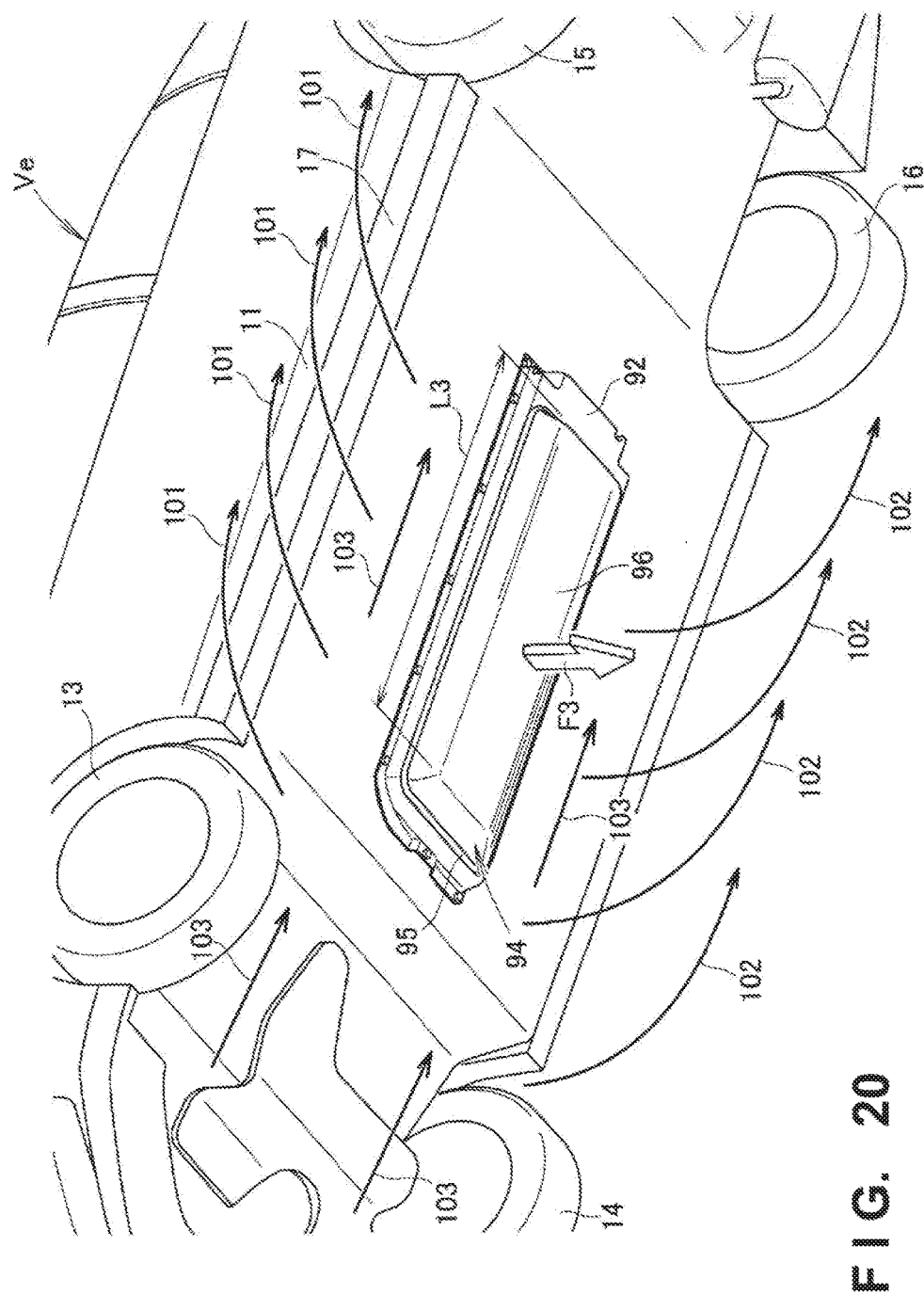
FIG. 20 is a view for explaining an example in which the aerodynamic performance of a vehicle is improved by the vehicle understructure according to the third embodiment.

An example in which the aerodynamic performance of a vehicle Ve is improved by the undercover 91 will be described next with reference to FIG. 20.

During driving of the vehicle Ve at a medium or high speed, airflows 101 and 102 are generated, which flow from the left front wheel 13 and the right front wheel 14 to the rear side of the vehicle outward in the vehicle width direction.

At the same time, by the driving of the vehicle Ve at a medium or high speed, a downward force F3 acts on the lowering bottom portion 96 of the lowering portion 94, and the center of the lowering bottom portion 96 in the vehicle width direction lowers to the lowermost position. The lowered lowering bottom portion 96 extends in a length L3 in the longitudinal direction of the lowering portion 94 (that is, in the vehicle longitudinal direction).

The lowering portion 94 is provided only in the central mounting portion 19f of the underpanel 19 and is therefore provided on the rear side of the vehicle with respect to the left and right front wheels 16 and 14 at the center in the vehicle width direction.

It is therefore possible to ensure the negative pressure between the lowering portion 94 and the road surface in a sufficient length from the left front wheel 13 to the rear side of the vehicle at the center in the vehicle width direction. When the length of the negative pressure is sufficiently ensured, the airflow 101 on the left side which flows from the left front wheel 13 to the rear side of the vehicle outward in the vehicle width direction can be attracted to the side of the vehicle Ve, and the spread of the airflow 101 outward in the vehicle width direction can be suppressed.

Simultaneously, the airflow 102 on the right side which flows from the right front wheel 14 to the rear side of the vehicle outward in the vehicle width direction can be attracted to the side of the vehicle Ve, and the spread of the airflow 102 outward in the vehicle width direction can be suppressed.

By suppressing the spread of the airflows 101 and 102 in this way, an air resistance generated by the airflow 101 flowing from the left front wheel 13 or the airflow 102 flowing from the right front wheel 14 can suitably be reduced, and the aerodynamic performance of the vehicle Ve can be improved.

When the lowering portion 94 is provided only in the central mounting portion 19f of the underpanel 19, an undercover need not be provided on each of the left and right sides of the underpanel 19 in the vehicle width direction, as in the first and second embodiments. Hence, the lowering portion 94 can be suppressed smaller as compared to the first and second embodiments.

This makes it possible to efficiently cause an airflow 103 to flow to the rear side of the vehicle during the driving of the vehicle Ve (during driving at a medium or high speed) and improve the aerodynamic performance of the vehicle Ve.

When the undercover 91 is provided only in the central mounting portion 19f of the underpanel 19, the number of undercovers 91 can be decreased as compared to the first and second embodiments. It is therefore possible to decrease the number of parts and simplify the structure.

Note that the vehicle understructure according to the present invention is not limited to the above-described embodiments, and changes and modifications can appropriately be made.

For example, the shapes and structures of the vehicle, the vehicle understructure, the left and right front wheels, the left and right rear wheels, the left and right side sills, the underpanel, the left and right undercovers, the undercover, the left and right cover portions, the lowering portion, and bottom portion, the apex, the inner and outer sloping portions, and the like shown in the first and second embodiments are not limited to those exemplified, and can be changed appropriately.

SUMMARY OF EMBODIMENTS

According to the first aspect of the present invention, there is provided a vehicle understructure in which an underpanel is provided between left and right side sills provided in a vehicle, and a lower surface of the vehicle is formed by the underpanel, characterized by comprising an undercover located only on a rear side of the vehicle with respect to a front wheel and only on a front side of the vehicle with respect to a rear wheel in the underpanel and provided from below inside in a vehicle width direction with respect to the side sills, wherein the undercover comprises a lowering portion configured to lower from the underpanel during driving and extending in a vehicle longitudinal direction such that the vehicle longitudinal direction becomes a longitudinal direction.

In the first aspect of the present invention, the undercover is provided only on a rear side of the vehicle with respect to a front wheel and only on a front side of the vehicle with respect to a rear wheel in the underpanel, and from below inside in the vehicle width direction with respect to the side sills. In addition, the undercover includes the lowering portion, and the lowering portion can lower from the underpanel.

Hence, during driving of the vehicle (that is, during driving at a medium or high speed), an airflow (wind caused by driving) flows between the lowering portion and the road surface. A negative pressure is generated between the lowering portion and the road surface, and the lowering portion lowers from the underpanel. When the lowering portion lowers, the negative pressure between the lowering portion and the road surface rises.

The lowering portion extends in the vehicle longitudinal direction such that the vehicle longitudinal direction becomes the longitudinal direction of the lowering portion. It is therefore possible to ensure the negative pressure between the lowering portion and the road surface in a sufficient length from the front wheels to the rear side of the vehicle. When the length of the negative pressure is sufficiently ensured, the airflow that flows from the front wheels to the rear side of the vehicle outward in the vehicle width direction can be attracted to the vehicle side, and the spread of the airflow outward in the vehicle width direction can be suppressed.

Accordingly, an air resistance generated by the airflow flowing from the front wheels can suitably be reduced, and the aerodynamic performance of the vehicle can be improved.

According to the second aspect of the present invention, the lowering portion is preferably provided on each of left and right sides of the underpanel in the vehicle width direction.

In the second aspect of the present invention, the undercover is provided on each of the left and right sides of the underpanel in the vehicle width direction. Hence, an airflow flowing from the front wheel on the left side can be attracted to the vehicle side by the lowering portion on the left side, and the spread of the airflow outward in the vehicle width direction can be suppressed. In addition, an airflow flowing from the front wheel on the right side can be attracted to the vehicle side by the lowering portion on the right side, and the spread of the airflow outward in the vehicle width direction can be suppressed.

Accordingly, an air resistance generated by the airflows flowing from the left and right front wheels can suitably be reduced, and the aerodynamic performance of the vehicle can be improved.

According to the third aspect of the present invention, the lowering portion is preferably provided only in a central portion of the underpanel in the vehicle width direction.

In the third aspect of the present invention, the lowering portion is provided only in the central portion of the underpanel in the vehicle width direction. Hence, the lowering portion is provided on the rear side of the vehicle from the front wheel and on the central portion in the vehicle width direction.

The airflow flowing from the front wheel to the rear side of the vehicle spreads outward in the vehicle width direction. The lowering portion is provided on the rear side of the vehicle from the front wheel and on the central portion in the vehicle width direction to raise the negative pressure in this region. Hence, the airflow spreading outward in the vehicle width direction can efficiently be attracted to the negative pressure side of the lowering portion.

The spread of the airflow outward in the vehicle width direction can thus be suppressed, and the air resistance can suitably be reduced.

In addition, when the lowering portion is provided only in the central portion of the underpanel in the vehicle width direction, the lowering portion can be suppressed small. This makes it possible to efficiently cause the airflow to flow during the driving of the vehicle (during driving at a medium or high speed) and improve the aerodynamic performance of the vehicle.

When the lowering portion is provided only in the central portion of the underpanel in the vehicle width direction, the number of undercovers can be decreased as compared to a case in which the lowering portion is provided on each of the left and right sides of the underpanel in the vehicle width direction. It is therefore possible to decrease the number of parts of the vehicle understructure and simplify the structure.

According to the fourth aspect of the present invention, the lowering portion preferably comprises an apex configured to lower to a lowermost position at a center of the undercover in the vehicle width direction and extending in the longitudinal direction of the lowering portion, and sloping portions jutting from the apex toward both side portions of the lowering portion.

In the fourth aspect of the present invention, the lowering portion includes an apex and sloping portions. The apex of the lowering portion is formed to be able to lower to a lowermost position at the center of the undercover in the vehicle width direction in a state in which the apex extends in the longitudinal direction. The sloping portions of the lowering portion jut from the apex toward the side portions of the lowering portion.

Hence, during driving of the vehicle, a negative pressure is generated under the apex and the sloping portions. The sloping portions jut from the apex to the side portions of the lowering portion. Hence, by the generated negative pressure, the airflow spreading outward in the vehicle width direction can satisfactorily be attracted to the apex via the sloping portions.

It is therefore possible to suppress the spread of the airflow outward in the vehicle width direction and suitably reduce the air resistance by the negative pressure generated under the apex and the sloping portions.

According to the fifth aspect of the present invention, the lowering portion is made of a thermoplastic elastomer and is lowered by a negative pressure generated between the lowering portion and a road surface during driving.

In the fifth aspect of the present invention, the negative pressure is generated between the lowering portion and the road surface, to ensure the stability of the vehicle.

INDUSTRIAL APPLICABILITY

The present invention can suitably be applied to a vehicle having a vehicle understructure in which an underpanel is provided between the side sills of the vehicle, and the lower surface of the vehicle is formed by the underpanel.

REFERENCE SIGNS LIST

Ve . . . vehicle
10, 60, 90 . . . vehicle understructure 13, 14 ... left and right front wheels (front wheels)
15, 16 ... left and right rear wheels (rear wheels)
17, 18 ... left and right side sills (side sills)
19 ... underpanel
21, 61 ... left undercover (undercover)
22, 62 ... right undercover (undercover)
26, 66 ... left and right cover portions
26a, 66a ... central portions of left and right cover portions in vehicle width direction
27, 67, 94 ... lowering portion
43, 78, 96 ... lowering bottom portion (bottom portion)
43a ... outside portion of bottom portion (one of two side portions of lowering portion)
43b ... inside portion of bottom portion (other of two side portions of lowering portion)
51 ... apex
52 ... outer sloping portion (sloping portion)
53 ... inner sloping portion (sloping portion)
91 ... undercover

What is claimed is:

1. A vehicle understructure comprising:
an underpanel provided between left and right side sills of a vehicle, the underpanel forming a lower surface of the vehicle; and
a pair of undercovers disposed in the underpanel and in parallel in a vehicle width direction, the pair of undercovers being located (i) inside in the vehicle width direction with respect to a left wheel and a right wheel, (ii) only on a rear side of the vehicle with respect to a front wheel, and (iii) only on a front side of the vehicle with respect to a rear wheel,
wherein each of the pair of undercovers includes a lowering portion configured to lower from the underpanel during driving, the lowering portion being rectangular shaped with a length thereof extending along a vehicle front-back direction.

2. The vehicle understructure according to claim 1, wherein the lowering portion is provided on each of left and right sides of the underpanel in the vehicle width direction.

3. The vehicle understructure according to claim 1, wherein the lowering portion is provided only in a central portion of the underpanel in the vehicle width direction.

4. A vehicle understructure comprising:
an underpanel provided between left and right side sills of a vehicle, the underpanel forming a lower surface of the vehicle; and
an undercover located in the underpanel, only on a rear side of the vehicle with respect to a front wheel, only on a front side of the vehicle with respect to a rear wheel, and inside in a vehicle width direction with respect to the side sills,
wherein the undercover includes a lowering portion configured to lower from the underpanel during driving, the lowering portion being rectangular shaped with a length thereof extending along a vehicle front-back direction, and
wherein the lowering portion includes:
an apex configured to lower to a lowermost position at a center of the undercover in the vehicle width direction and extending in the longitudinal direction of the lowering portion; and
sloping portions jutting from the apex toward both side portions of the lowering portion.

5. The vehicle understructure according to claim 1, wherein the lowering portion is made of a thermoplastic elastomer and is lowered by a negative pressure generated between the lowering portion and a road surface during driving.

* * * * *